United States Patent
Kim

(10) Patent No.: US 10,372,658 B2
(45) Date of Patent: Aug. 6, 2019

(54) METHOD OF RECONFIGURING DQ PADS OF MEMORY DEVICE AND DQ PAD RECONFIGURABLE MEMORY DEVICE

(71) Applicant: Samsung Electronics Co., Ltd., Suwon-si (KR)

(72) Inventor: Chan-Kyung Kim, Hwaseong-si (KR)

(73) Assignee: Samsung Electronics Co., Ltd. (KR)

(*) Notice: Subject to any disclaimer, the term of this patent is extended or adjusted under 35 U.S.C. 154(b) by 80 days.

(21) Appl. No.: 15/677,475

(22) Filed: Aug. 15, 2017

(65) Prior Publication Data

US 2018/0189219 A1   Jul. 5, 2018

(30) Foreign Application Priority Data

Jan. 2, 2017   (KR) .................. 10-2017-0000446

(51) Int. Cl.
| | | |
|---|---|---|
| *G11C 8/00* | (2006.01) | |
| *G06F 13/40* | (2006.01) | |
| *G06F 3/00* | (2006.01) | |
| *G06F 13/12* | (2006.01) | |

(52) U.S. Cl.
CPC .......... *G06F 13/4095* (2013.01); *G06F 3/002* (2013.01); *G06F 13/12* (2013.01)

(58) Field of Classification Search
CPC ....... G06F 13/4095; G06F 3/002; G06F 13/12
USPC .................................... 365/230.06
See application file for complete search history.

(56) References Cited

U.S. PATENT DOCUMENTS

| | | | | |
|---|---|---|---|---|
| 5,893,927 A | * | 4/1999 | Hovis | G11C 7/1045 711/102 |
| 6,986,118 B2 | | 1/2006 | Dickman | |
| 7,161,851 B2 | | 1/2007 | Peterson et al. | |
| 7,505,351 B2 | * | 3/2009 | Kwon | G11C 7/1012 365/230.01 |
| 7,515,453 B2 | | 4/2009 | Rajan | |
| 7,715,254 B2 | * | 5/2010 | Kwon | G11C 7/1012 365/189.04 |
| 8,264,881 B2 | * | 9/2012 | Kobayashi | G11C 7/1045 365/185.05 |
| 8,335,895 B2 | | 12/2012 | Lee | |
| 8,476,768 B2 | * | 7/2013 | Kumar | H01L 23/50 257/773 |
| 8,644,089 B2 | * | 2/2014 | Jung | G11C 11/406 365/189.05 |
| 8,769,234 B2 | | 7/2014 | Perego et al. | |
| 2004/0019756 A1 | * | 1/2004 | Perego | G11O 5/025 711/170 |

(Continued)

*Primary Examiner* — Xiaochun L Chen
(74) *Attorney, Agent, or Firm* — Onello & Mello, LLP

(57) ABSTRACT

A method and a memory device therefor for reconfiguring a DQ pad organization of the memory device on-the-fly. A DQ organization reconfiguration control unit generates a control signal for reconfiguring the DQ pad organization into a desired mode based on a user command. A DQ organization reconfiguration unit is provided between P DQ pads and memory cell arrays and reconfigures organization P DQ pads on-the-fly in any one among Xi DQ pad modes, where i=1, 2, 4, 8, 16, 32, 64, and 128, based on the control signal. For the reconfiguration of the organization of the DQ pads, a plurality of bus lines for data transfer, being switchable by a control signal, are provided. The bus lines are implemented utilizing at least one of the M3 and M4 metal layers of the memory device.

20 Claims, 17 Drawing Sheets

(56) References Cited

U.S. PATENT DOCUMENTS

| | | | |
|---|---|---|---|
| 2006/0161743 A1 | 7/2006 | Fekih-Romdhane et al. | |
| 2007/0237019 A1* | 10/2007 | Kwon | G11C 7/1012 |
| | | | 365/230.03 |
| 2009/0180338 A1* | 7/2009 | Kwon | G11C 7/1012 |
| | | | 365/191 |
| 2010/0128539 A1* | 5/2010 | Kobayashi | G11C 7/1045 |
| | | | 365/189.05 |
| 2013/0001790 A1* | 1/2013 | Kumar | H01L 23/50 |
| | | | 257/773 |
| 2013/0336073 A1* | 12/2013 | Jung | G11C 11/406 |
| | | | 365/189.05 |
| 2014/0281204 A1 | 9/2014 | Jeddeloh et al. | |

* cited by examiner

| DQ Pad Mode | Case | Memory Cell --> DQ Pad | DQ28 S16 | DQ12 S8 | DQ20 S16 | DQ4 S4 | DQ24 S16 | DQ8 S8 | DQ16 S16 | DQ0 S2 |
|---|---|---|---|---|---|---|---|---|---|---|
| X32 | 1 | 0->0<br>16->16<br>8->8<br>24->24 | 0 | 0 | 0 | 0 | 0 | 0 | 0 | 1 |
| X16 | 1 | 0->0<br>8->8 | 0 | 0 | 0 | 0 | 0 | 0 | 0 | 1 |
| X16 | 2 | 16->0<br>24->8 | 1 | 0 | 1 | 0 | 1 | 0 | 1 | 1 |
| X8 | 1 | 0->0 | 0 | 0 | 0 | 0 | 0 | 0 | 0 | 1 |
| X8 | 2 | 16->0 | 0 | 0 | 1 | 0 | 0 | 0 | 1 | 1 |
| X8 | 3 | 8->0 | 0 | 1 | 0 | 0 | 0 | 1 | 0 | 1 |
| X8 | 4 | 24->0 | 1 | 1 | 0 | 0 | 1 | 1 | 0 | 1 |
| X4 | 1 | 0->0 | 0 | 0 | 0 | 0 | 0 | 0 | 0 | 1 |
| X4 | 2 | 16->0 | 0 | 0 | 0 | 0 | 0 | 0 | 1 | 1 |
| X4 | 3 | 8->0 | 0 | 0 | 0 | 0 | 0 | 1 | 0 | 1 |
| X4 | 4 | 24->0 | 0 | 0 | 0 | 0 | 1 | 1 | 0 | 1 |
| X4 | 5 | 4->0 | 0 | 0 | 0 | 1 | 0 | 0 | 0 | 1 |
| X4 | 6 | 12->0 | 0 | 1 | 0 | 1 | 0 | 0 | 0 | 1 |
| X4 | 7 | 20->0 | 0 | 0 | 1 | 1 | 0 | 0 | 0 | 1 |
| X4 | 8 | 28->0 | 1 | 1 | 0 | 1 | 0 | 0 | 0 | 1 |
| X2 | 1 | 0->0 | 0 | 0 | 0 | 0 | 0 | 0 | 0 | 1 |
| X2 | 2 | 16->0 | 0 | 0 | 0 | 0 | 0 | 0 | 1 | 1 |
| X2 | 3 | 8->0 | 0 | 0 | 0 | 0 | 0 | 1 | 0 | 1 |
| X2 | 4 | 24->0 | 0 | 0 | 0 | 0 | 1 | 1 | 0 | 1 |
| X2 | 5 | 4->0 | 0 | 0 | 0 | 1 | 0 | 0 | 0 | 1 |
| X2 | 6 | 20->0 | 0 | 0 | 1 | 1 | 0 | 0 | 0 | 1 |
| X2 | 7 | 12->0 | 0 | 1 | 0 | 1 | 0 | 0 | 0 | 1 |
| X2 | 8 | 28->0 | 1 | 1 | 0 | 1 | 0 | 0 | 0 | 1 |
| X2 | 9 | 2->0 | 0 | 0 | 0 | 0 | 0 | 0 | 0 | 1 |
| X2 | 10 | 18->0 | 0 | 0 | 0 | 0 | 0 | 0 | 0 | 1 |
| X2 | 11 | 10->0 | 0 | 0 | 0 | 0 | 0 | 0 | 0 | 1 |
| X2 | 12 | 26->0 | 0 | 0 | 0 | 0 | 0 | 0 | 0 | 1 |
| X2 | 13 | 6->0 | 0 | 0 | 0 | 0 | 0 | 0 | 0 | 1 |
| X2 | 14 | 22->0 | 0 | 0 | 0 | 0 | 0 | 0 | 0 | 1 |
| X2 | 15 | 14->0 | 0 | 0 | 0 | 0 | 0 | 0 | 0 | 1 |
| X2 | 16 | 30->0 | 0 | 0 | 0 | 0 | 0 | 0 | 0 | 1 |

FIG. 9B

| DQ Pad Mode | Case | Memory Cell--> DQ Pad | DQ30 S16 | DQ14 S8 | DQ22 S16 | DQ6 S4 | DQ26 S16 | DQ10 S8 | DQ18 S16 | DQ2 S2 |
|---|---|---|---|---|---|---|---|---|---|---|
| X32 | 1 | 0->0<br>16->16<br>8->8<br>24->24 | 0 | 0 | 0 | 0 | 0 | 0 | 0 | 0 |
| X16 | 1 | 0->0<br>8->8 | 0 | 0 | 0 | 0 | 0 | 0 | 0 | 0 |
| X16 | 2 | 16->0<br>24->8 | 1 | 0 | 1 | 0 | 1 | 0 | 1 | 0 |
| X8 | 1 | 0->0 | 0 | 0 | 0 | 0 | 0 | 0 | 0 | 0 |
| X8 | 2 | 16->0 | 0 | 0 | 1 | 0 | 0 | 0 | 1 | 0 |
| X8 | 3 | 8->0 | 0 | 1 | 0 | 0 | 0 | 1 | 0 | 0 |
| X8 | 4 | 24->0 | 1 | 1 | 0 | 0 | 1 | 1 | 0 | 0 |
| X4 | 1 | 0->0 | 0 | 0 | 0 | 0 | 0 | 0 | 0 | 0 |
| X4 | 2 | 16->0 | 0 | 0 | 0 | 0 | 0 | 0 | 1 | 0 |
| X4 | 3 | 8->0 | 0 | 0 | 0 | 0 | 0 | 1 | 0 | 0 |
| X4 | 4 | 24->0 | 0 | 0 | 0 | 0 | 1 | 1 | 0 | 0 |
| X4 | 5 | 4->0 | 0 | 0 | 0 | 1 | 0 | 0 | 0 | 0 |
| X4 | 6 | 12->0 | 0 | 1 | 0 | 1 | 0 | 0 | 0 | 0 |
| X4 | 7 | 20->0 | 0 | 0 | 1 | 1 | 0 | 0 | 0 | 0 |
| X4 | 8 | 28->0 | 1 | 1 | 0 | 1 | 0 | 0 | 0 | 0 |
| X2 | 1 | 0->0 | 0 | 0 | 0 | 0 | 0 | 0 | 0 | 0 |
| X2 | 2 | 16->0 | 0 | 0 | 0 | 0 | 0 | 0 | 0 | 0 |
| X2 | 3 | 8->0 | 0 | 0 | 0 | 0 | 0 | 0 | 0 | 0 |
| X2 | 4 | 24->0 | 0 | 0 | 0 | 0 | 0 | 0 | 0 | 0 |
| X2 | 5 | 4->0 | 0 | 0 | 0 | 0 | 0 | 0 | 0 | 0 |
| X2 | 6 | 20->0 | 0 | 0 | 0 | 0 | 0 | 0 | 0 | 0 |
| X2 | 7 | 12->0 | 0 | 0 | 0 | 0 | 0 | 0 | 0 | 0 |
| X2 | 8 | 28->0 | 0 | 0 | 0 | 0 | 0 | 0 | 0 | 0 |
| X2 | 9 | 2->0 | 0 | 0 | 0 | 0 | 0 | 0 | 0 | 1 |
| X2 | 10 | 18->0 | 0 | 0 | 0 | 0 | 0 | 0 | 1 | 1 |
| X2 | 11 | 10->0 | 0 | 0 | 0 | 0 | 0 | 1 | 0 | 1 |
| X2 | 12 | 26->0 | 0 | 0 | 0 | 0 | 1 | 1 | 0 | 1 |
| X2 | 13 | 6->0 | 0 | 0 | 0 | 1 | 0 | 0 | 0 | 1 |
| X2 | 14 | 22->0 | 0 | 0 | 1 | 1 | 0 | 0 | 0 | 1 |
| X2 | 15 | 14->0 | 0 | 1 | 0 | 1 | 0 | 0 | 0 | 1 |
| X2 | 16 | 30->0 | 1 | 1 | 0 | 1 | 0 | 0 | 0 | 1 |

FIG. 9C

| DQ Pad Mode | Case | Memory Cell --> DQ Pad | DQ30 S16 | DQ14 S8 | DQ22 S16 | DQ6 S4 | DQ26 S16 | DQ10 S8 | DQ18 S16 | DQ2 S2 |
|---|---|---|---|---|---|---|---|---|---|---|
| X1 | 1 | 0->0 | 0 | 0 | 0 | 0 | 0 | 0 | 0 | 1 |
|  | 2 | 16->0 | 0 | 0 | 0 | 0 | 0 | 0 | 1 | 1 |
|  | 3 | 8->0 | 0 | 0 | 0 | 0 | 0 | 1 | 0 | 1 |
|  | 4 | 24->0 | 0 | 0 | 0 | 0 | 1 | 1 | 0 | 1 |
|  | 5 | 4->0 | 0 | 0 | 0 | 1 | 0 | 0 | 0 | 1 |
|  | 6 | 20->0 | 0 | 0 | 1 | 1 | 0 | 0 | 0 | 1 |
|  | 7 | 12->0 | 0 | 1 | 0 | 1 | 0 | 0 | 0 | 1 |
|  | 8 | 28->0 | 1 | 1 | 0 | 1 | 0 | 0 | 0 | 1 |
|  | 9 | 2->0 | 0 | 0 | 0 | 0 | 0 | 0 | 0 | 1 |
|  | 10 | 18->0 | 0 | 0 | 0 | 0 | 0 | 0 | 0 | 1 |
|  | 11 | 10->0 | 0 | 0 | 0 | 0 | 0 | 0 | 0 | 1 |
|  | 12 | 26->0 | 0 | 0 | 0 | 0 | 0 | 0 | 0 | 1 |
|  | 13 | 6->0 | 0 | 0 | 0 | 0 | 0 | 0 | 0 | 1 |
|  | 14 | 22->0 | 0 | 0 | 0 | 0 | 0 | 0 | 0 | 1 |
|  | 15 | 14->0 | 0 | 0 | 0 | 0 | 0 | 0 | 0 | 1 |
|  | 16 | 30->0 | 0 | 0 | 0 | 0 | 0 | 0 | 0 | 1 |
|  | 17 | 1->0 | 0 | 0 | 0 | 0 | 0 | 0 | 0 | 1 |
|  | 18 | 17->0 | 0 | 0 | 0 | 0 | 0 | 0 | 1 | 1 |
|  | 19 | 8->0 | 0 | 0 | 0 | 0 | 0 | 1 | 0 | 1 |
|  | 20 | 25->0 | 0 | 0 | 0 | 0 | 1 | 1 | 0 | 1 |
|  | 21 | 5->0 | 0 | 0 | 0 | 1 | 0 | 0 | 0 | 1 |
|  | 22 | 21->0 | 0 | 0 | 1 | 1 | 0 | 0 | 0 | 1 |
|  | 23 | 13->0 | 0 | 1 | 0 | 1 | 0 | 0 | 0 | 1 |
|  | 24 | 29->0 | 1 | 1 | 0 | 1 | 0 | 0 | 0 | 1 |
|  | 25 | 3->0 | 0 | 0 | 0 | 0 | 0 | 0 | 0 | 1 |
|  | 26 | 19->0 | 0 | 0 | 0 | 0 | 0 | 0 | 0 | 1 |
|  | 27 | 11->0 | 0 | 0 | 0 | 0 | 0 | 0 | 0 | 1 |
|  | 28 | 27->0 | 0 | 0 | 0 | 0 | 0 | 0 | 0 | 1 |
|  | 29 | 7->0 | 0 | 0 | 0 | 0 | 0 | 0 | 0 | 1 |
|  | 30 | 23->0 | 0 | 0 | 0 | 0 | 0 | 0 | 0 | 1 |
|  | 31 | 15->0 | 0 | 0 | 0 | 0 | 0 | 0 | 0 | 1 |
|  | 32 | 31->0 | 0 | 0 | 0 | 0 | 0 | 0 | 0 | 1 |

FIG. 9D

| DQ Pad Mode | Case | Memory Cell --> DQ Pad | DQ28 S16 | DQ12 S8 | DQ20 S16 | DQ4 S4 | DQ24 S16 | DQ8 S8 | DQ16 S16 | DQ0 S2 |
|---|---|---|---|---|---|---|---|---|---|---|
| X1 | 1 | 0->0 | 0 | 0 | 0 | 0 | 0 | 0 | 0 | 0 |
| | 2 | 16->0 | 0 | 0 | 0 | 0 | 0 | 0 | 0 | 0 |
| | 3 | 8->0 | 0 | 0 | 0 | 0 | 0 | 0 | 0 | 0 |
| | 4 | 24->0 | 0 | 0 | 0 | 0 | 0 | 0 | 0 | 0 |
| | 5 | 4->0 | 0 | 0 | 0 | 0 | 0 | 0 | 0 | 0 |
| | 6 | 20->0 | 0 | 0 | 0 | 0 | 0 | 0 | 0 | 0 |
| | 7 | 12->0 | 0 | 0 | 0 | 0 | 0 | 0 | 0 | 0 |
| | 8 | 28->0 | 0 | 0 | 0 | 0 | 0 | 0 | 0 | 0 |
| | 9 | 2->0 | 0 | 0 | 0 | 0 | 0 | 0 | 0 | 1 |
| | 10 | 18->0 | 0 | 0 | 0 | 0 | 0 | 0 | 1 | 1 |
| | 11 | 10->0 | 0 | 0 | 0 | 0 | 0 | 1 | 0 | 1 |
| | 12 | 26->0 | 0 | 0 | 0 | 0 | 1 | 1 | 0 | 1 |
| | 13 | 6->0 | 0 | 0 | 0 | 1 | 0 | 0 | 0 | 1 |
| | 14 | 22->0 | 0 | 0 | 1 | 1 | 0 | 0 | 0 | 1 |
| | 15 | 14->0 | 0 | 1 | 0 | 1 | 0 | 0 | 0 | 1 |
| | 16 | 30->0 | 1 | 1 | 0 | 1 | 0 | 0 | 0 | 1 |
| | 17 | 1->0 | 0 | 0 | 0 | 0 | 0 | 0 | 0 | 0 |
| | 18 | 17->0 | 0 | 0 | 0 | 0 | 0 | 0 | 0 | 0 |
| | 19 | 8->0 | 0 | 0 | 0 | 0 | 0 | 0 | 0 | 0 |
| | 20 | 25->0 | 0 | 0 | 0 | 0 | 0 | 0 | 0 | 0 |
| | 21 | 5->0 | 0 | 0 | 0 | 0 | 0 | 0 | 0 | 0 |
| | 22 | 21->0 | 0 | 0 | 0 | 0 | 0 | 0 | 0 | 0 |
| | 23 | 13->0 | 0 | 0 | 0 | 0 | 0 | 0 | 0 | 0 |
| | 24 | 29->0 | 0 | 0 | 0 | 0 | 0 | 0 | 0 | 0 |
| | 25 | 3->0 | 0 | 0 | 0 | 0 | 0 | 0 | 0 | 1 |
| | 26 | 19->0 | 0 | 0 | 0 | 0 | 0 | 0 | 1 | 1 |
| | 27 | 11->0 | 0 | 0 | 0 | 0 | 0 | 1 | 0 | 1 |
| | 28 | 27->0 | 0 | 0 | 0 | 0 | 1 | 1 | 0 | 1 |
| | 29 | 7->0 | 0 | 0 | 0 | 1 | 0 | 0 | 0 | 1 |
| | 30 | 23->0 | 0 | 0 | 1 | 1 | 0 | 0 | 0 | 1 |
| | 31 | 15->0 | 0 | 1 | 0 | 1 | 0 | 0 | 0 | 1 |
| | 32 | 31->0 | 1 | 1 | 0 | 1 | 0 | 0 | 0 | 1 |

(a) (4-ROW PAD) X32 MODE:DQ31~DQ0

| 14 | 2 | 12 | 0 | 1 | 13 | 3 | 15 |
| 30 | 18 | 28 | 16 | 17 | 29 | 19 | 31 |
| 6 | 10 | 4 | 8 | 9 | 5 | 11 | 7 |
| 22 | 26 | 20 | 24 | 25 | 21 | 27 | 23 |

(b) (4-ROW PAD) X16 MODE:DQ15~DQ0

| 14 | 2 | 12 | 0 | 1 | 13 | 3 | 15 |
| 30 | 18 | 28 | 16 | 17 | 29 | 19 | 31 |
| 6 | 10 | 4 | 8 | 9 | 5 | 11 | 7 |
| 22 | 26 | 20 | 24 | 25 | 21 | 27 | 23 |

(c) (4-ROW PAD) X8 MODE:DQ7~DQ0

| 14 | 2 | 12 | 0 | 1 | 13 | 3 | 15 |
| 30 | 18 | 28 | 16 | 17 | 29 | 19 | 31 |
| 6 | 10 | 4 | 8 | 9 | 5 | 11 | 7 |
| 22 | 26 | 20 | 24 | 25 | 21 | 27 | 23 |

(d) (4-ROW PAD) X4 MODE:DQ3~DQ0

| 14 | 2 | 12 | 0 | 1 | 13 | 3 | 15 |
| 30 | 18 | 28 | 16 | 17 | 29 | 19 | 31 |
| 6 | 10 | 4 | 8 | 9 | 5 | 11 | 7 |
| 22 | 26 | 20 | 24 | 25 | 21 | 27 | 23 |

(e) (4-ROW PAD) X2 MODE:DQ1~DQ0

| 14 | 2 | 12 | 0 | 1 | 13 | 3 | 15 |
| 30 | 18 | 28 | 16 | 17 | 29 | 19 | 31 |
| 6 | 10 | 4 | 8 | 9 | 5 | 11 | 7 |
| 22 | 26 | 20 | 24 | 25 | 21 | 27 | 23 |

(f) (4-ROW PAD) X1 MODE:DQ0

| 14 | 2 | 12 | 0 | 1 | 13 | 3 | 15 |
| 30 | 18 | 28 | 16 | 17 | 29 | 19 | 31 |
| 6 | 10 | 4 | 8 | 9 | 5 | 11 | 7 |
| 22 | 26 | 20 | 24 | 25 | 21 | 27 | 23 |

METHOD OF RECONFIGURING DQ PADS OF MEMORY DEVICE AND DQ PAD RECONFIGURABLE MEMORY DEVICE

CROSS-REFERENCE TO RELATED APPLICATION

This U.S. non-provisional application claims priority under 35 USC § 119 from Korean Patent Application No. 10-2017-0000446, filed on Jan. 2, 2017 in the Korean Intellectual Property Office (KIPO), the disclosure of which is hereby incorporated by reference in its entirety.

BACKGROUND

1. Technical Field

Some embodiments of the present inventive concepts are directed to a memory device, and, more particularly to a method of freely converting a DQ pad organization of a memory device into a desired mode on-the-fly.

2. Discussion of the Related Art

In general, memory cells in a memory device are connected to the outside through DQ pads, that is, input/output pins (I/O pins). The DQ pads are used as an external interface. That is, DQ pads are used for data input and output to and from, respectively, the memory cells. During a write operation, a voltage (for example, high=1, low=0) is applied to a DQ pad, which is converted into an appropriate signal corresponding thereto and stored in the selected memory cell. During a read operation, when the access is complete and the output is enabled (for example, OE is low), the data read from the selected memory cell appears in the DQ pad. When accessing the memory cell array once, the number of data that can be simultaneously input/output to/from the memory cells is the unit number of DQ pads. For example, in a case in which a DRAM has thirty-two DQ pads, the unit numbers of the DQ pads may include, for example, 2, 4, 8, 16, 32, etc. which can be denoted as X2, X4, X8, X16, X32 DQ pad modes, etc., respectively.

When each of the conventional memory devices is released, the unit number of the DQ pads, that is, the DQ pad mode, is set as one. And once the DQ pad mode is set as one, it is fixed definitively. In the conventional memory device, the DQ pad mode cannot be changed to a different DQ pad mode while using the memory device. Therefore, the memory device manufacturer must separately manufacture memory devices for each DQ pad mode, and, as a result, the memory device purchaser also needs to specify the desired DQ pad mode of the memory device at the time of purchasing. Further, if a user needs to use several kinds of DQ pad modes, the user must buy multiple memory devices having the desired DQ pad modes.

SUMMARY

Some embodiments of the present inventive concepts provide a DQ pad reconfiguring method of a memory device capable of freely changing a memory device DQ pad mode from one to any other among a plurality of DQ pad modes while using the memory device, and a DQ pad reconfigurable memory device to which the method is applied.

Some embodiments of the present inventive concepts provide a DQ pad reconfiguring method of a memory device capable of on-the-fly changing of a DQ pad mode of the memory device, that is changing the DQ pad mode of the memory device while using the memory device, while minimizing a chip size overhead by utilizing at least one of M3 and M4 metal layers, and a DQ pad reconfigurable memory device to which the method is applied.

In one aspect, the present inventive concepts are directed to a method of reconfiguring a DQ pad organization of a memory device comprising P DQ pads and memory cell arrays corresponding to the P DQ pads. The method includes providing a DQ organization reconfiguration unit with a control signal for reconfiguring an organization of the P DQ pads, where $P=2^n$ and n is at least one of 4, 5, 6, and 7, into a desired DQ pad mode based on a user command, wherein the DQ organization reconfiguration unit between the P DQ pads and the memory cell arrays, comprises data transfer paths capable of reconfiguring the organization of the P DQ pads into at least one DQ pad mode among a plurality of DQ pad modes, and the plurality of DQ pad modes include Xi DQ pad modes in which only i DQ pads among the P DQ pads are used for writing and reading data into/from the memory cell arrays, where $i=2^k$ and k is an integer from 0 to n. The method also includes reconfiguring the organization of the P DQ pads into a desired DQ pad mode by changing the data transfer paths of the DQ organization reconfiguration unit based on the control signal.

In addition, in another aspect, the present inventive concepts are directed to a memory device including P DQ pads and memory cell arrays corresponding to the P DQ pads. The memory device includes a DQ organization reconfiguration control unit configured to generate a control signal for reconfiguring an organization of the P DQ pads, where $P=2^n$ and n is at least one of 4, 5, 6, and 7, into a desired DQ pad mode based on a user command. The memory device also includes a DQ organization reconfiguration unit, between the P DQ pads and the memory cell arrays, comprising data transfer paths capable of reconfiguring the organization of the P DQ pads into at least one DQ pad mode among a plurality of DQ pad modes, the DQ organization reconfiguration unit configured to reconfigure the organization of the P DQ pads into a desired DQ pad mode by changing the data transfer paths based on the control signal provided by the DQ organization reconfiguration control unit. The plurality of DQ pad modes include Xi DQ pad modes in which only i DQ pads among the P DQ pads are used for writing and reading data into/from the memory cell arrays, where $i=2^k$ and k is an integer from 0 to n.

In another aspect, the present inventive concepts are directed to a memory device, including P DQ pads and memory cell arrays corresponding to the P DQ pads. The memory device includes a DQ organization reconfiguration control unit configured to generate a control signal for reconfiguring an organization of the P DQ pads, where $P=2^n$ and n is at least one of 4, 5, 6, and 7, into a desired DQ pad mode based on a user command. The memory device further includes a DQ organization reconfiguration unit between the P DQ pads and the memory cell arrays configured to reconfigure the organization of the P DQ pads during use of the memory device in at least one of Xi DQ pad modes in which only i DQ pads among the P DQ pads are used for writing and reading data into/from the memory cell arrays, where $i=2^k$ and k is an integer from 0 to n. The DQ organization reconfiguration unit comprises a plurality of bus lines switchable by the control signals from the DQ organization reconfiguration control unit.

While using a memory device, users may desire to use a DQ pad mode other than one being used, that is, the users may desire want to change to another desired mode as needed. For example, the users may want to use the memory device in a X16 DQ pad mode, then switch to a X8 DQ pad mode, and may further want to change the changed X8 DQ pad mode once again to a X32 DQ pad mode. However, the users are not able to freely change the DQ pad mode according to the conventional memory device during use of the memory device.

In order to freely reconfigure the DQ pad organization of the memory device on-the-fly, that is during use of the memory device, into a desired mode among a plurality of DQ pad modes, for example, such as X32, X16, X8, X4, X2 and X1 modes, the DQ pads themselves must be able to connect 32, 16, 8, 4, 2, or 1 to each other, and this requires a large number of wires. To implement such wiring, the chip size overhead can be increased. In many conventional DRAM devices, two metal layers, that is, M1 and M2 metal layers, are mainly employed. In a limited number of metal layer structure, the introduction of a circuit to support changing the unit number of the DQ pads during use of the memory device causes a large overhead of the chip size of the memory device. For example, the conventional DRAM devices have mainly employed two metal layers, that is, metal layers 1 (M1) and 2 (M2) in order to lower the production cost. As the degree of integration of the memory device has increased and the related circuits have become complicated, a third metal layer 3 (M3) has been newly employed, and a fourth metal layer 4 (M4) has recently been introduced. If any one or both of the M3 and M4 layers are used, the present inventive concepts may be realized without causing large overhead of the memory chip size. In particular, by utilizing the M4 layer, the present inventive concepts may be implemented while causing almost no overhead of the memory chip size.

Conventionally, once a system to which the memory device is to be applied is specified, the DQ pad mode of the memory device is also fixed definitely. Therefore, the DQ pad mode cannot be changed during use of the memory device. However, according to the present inventive concept, the DQ pad mode can be changed to a desired mode of a plurality of modes at any time during use of the memory device. As a result, the usability of the memory device may be greatly enhanced and an application range of the memory device may be diversified.

In the conventional memory devices, the manufacturer has to manufacture memory devices as separate products for each DQ pad mode. In contrast, according to the present inventive concepts, the manufacturer may fabricate the memory device as one type having the DQ pad reconfiguration means regardless of the type of the DQ pad mode. That is, the manufacturer may manufacture a single memory device which is able to switch between multiple DQ pad modes during use of the memory device. As the kinds of products to be manufactured are simplified, the mass productivity can be greatly improved and the production cost can be greatly reduced. The purchaser can purchase the memory device without considering the DQ pad mode to be used, which can greatly increase the freedom in the use of memory devices.

BRIEF DESCRIPTION OF THE DRAWINGS

These and/or other aspects and advantages of the present general inventive concepts will become apparent and more readily appreciated from the following description of the embodiments, taken in conjunction with the accompanying drawings of which:

FIG. 1 illustrates symmetrical arrangements of one-row pads that may be applied when switching a DQ pad mode of a memory device to any one of X32 mode to X1 mode on-the-fly, in accordance with some embodiments of the present inventive concepts.

FIGS. 9A to 9D illustrate switch control logic necessary to reconfigure thirty-two DQ pads on-the-fly into a desired DQ pad mode among the X32, X16, X8, X4, X2, and X1 modes for a read operation, according to some embodiments of the present inventive concepts;

FIG. 12 illustrates symmetrical arrangements of two-row pads that may be applied when switching a DQ pad mode of a memory device from among X32 mode to X1 mode on-the-fly, in accordance with some embodiments of the present inventive concepts;

FIG. 13 illustrates symmetrical arrangements of four-row pads that may be applied when switching the DQ pad mode of a memory device from the X32 mode to the X1 mode on-the-fly, in accordance with some embodiments of the present inventive concepts.

DETAILED DESCRIPTION OF THE EMBODIMENTS

Figure 2:
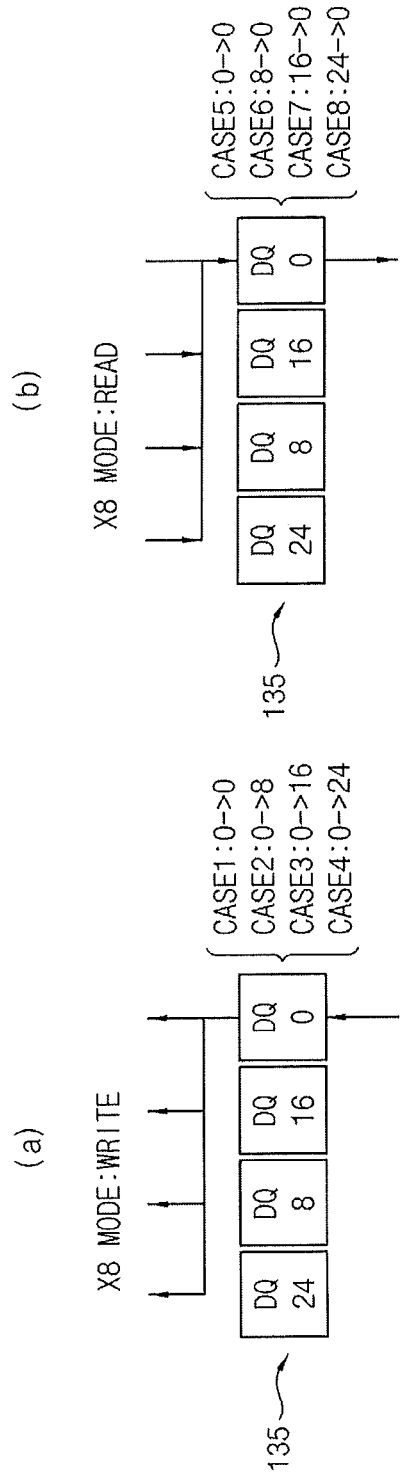
FIG. 2 illustrates four cases of a read operation and four cases of a write operation based on an example organization of four DQ pads, one of which is used for inputting/outputting data, in accordance with some embodiments of the present inventive concepts.

Reference will now be made in detail to the embodiments of the present general inventive concepts, examples of which are illustrated in the accompanying drawings, wherein like reference numerals refer to the like elements throughout. The embodiments are described.

Figure 1:
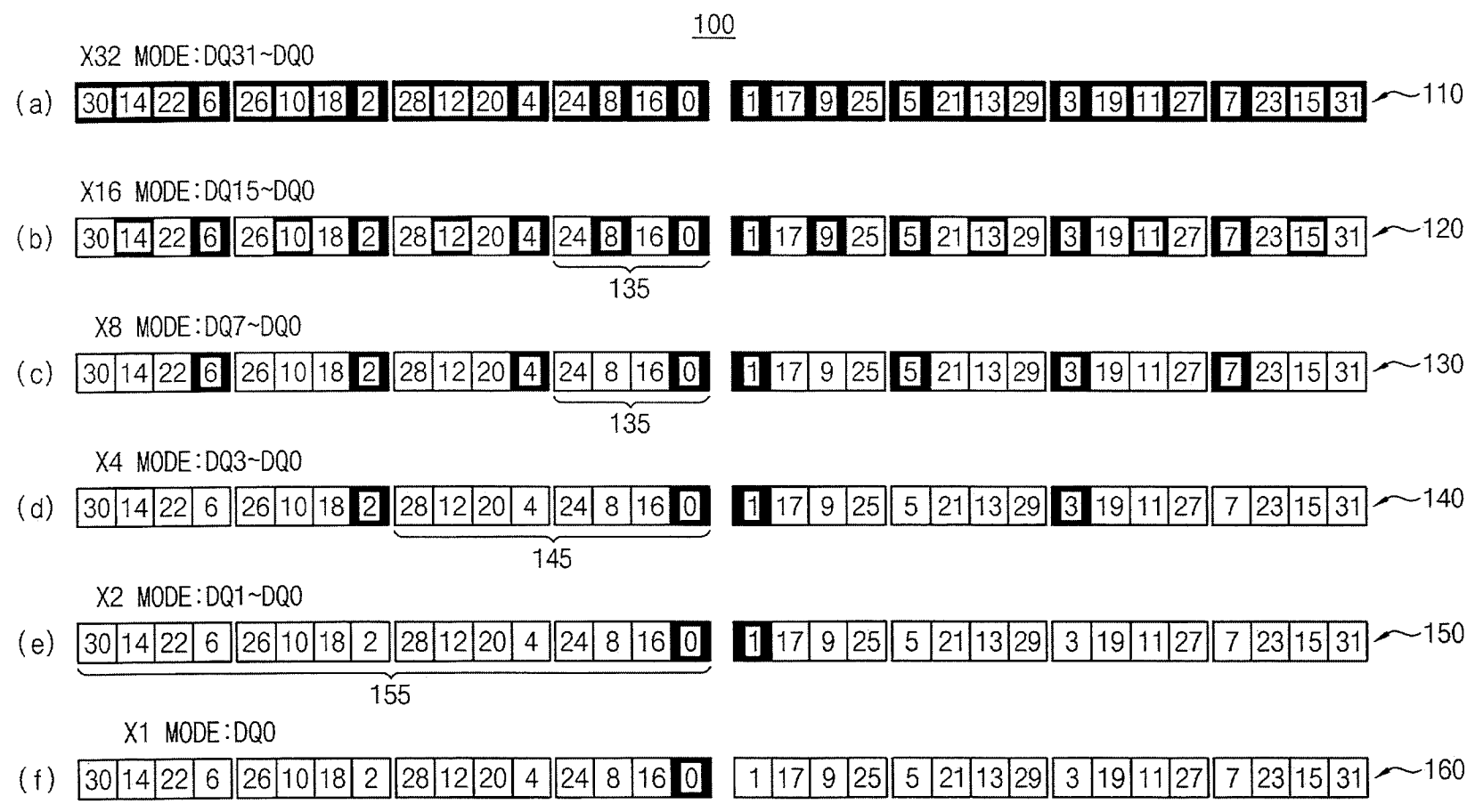

FIG. 1 illustrates symmetrical arrangements of one-row pads that may be applied when switching a DQ pad mode of a memory device to any one of X32 mode to X1 mode on-the-fly, according to some embodiments of the present inventive concepts.

The illustrated pad arrangement 100, of (a) to (f) of FIG. 1, is a case in which thirty-two DQ pads are arranged in one row. In the illustrated pad arrangement 100, even-numbered DQ pads and odd-numbered DQ pads are arranged in the left half and the right half, respectively. The even-numbered DQs in the left half are arranged in the order of DQ30, DQ14, DQ22, DQ6, DQ26, DQ10, DQ18, DQ2, DQ28, DQ12, DQ20, DQ4, DQ24, DQ8, DQ16 and DQ0 from the leftmost end to the center. The odd-numbered DQ pads in the right half are arranged in the order of DQ31, DQ15, DQ23, DQ7, DQ27, DQ11, DQ19, DQ3, DQ29, DQ1, DQ21, DQ5, DQ25, DQ9, DQ17 and DQ1 from the rightmost end to the center.

The thick square boxes shown in FIG. 1 represent active DQ pads used in each DQ pad mode. In the X32 mode 110, as illustrated in (a) of FIG. 1, all of the DQ pads from DQ0 to DQ31 are used, that is, are active. In the X16 mode 120, as illustrated in (b) of FIG. 1, a total of sixteen DQ pads may be used from DQ0 to DQ15, that is, a total of sixteen DQ pads may be active. The active DQ pads are symmetrically arranged with respect to the center, being located at the $(1+2k)^{th}$ positions from the center to both ends, where k is an integer from 0 to 7. For example, in the X16 mode 120, DQ pads DQ14, DQ6, DQ10, DQ2, DQ12, DQ4, DQ8, DQ0, DQ1, DQ9, DQ5, DQ13, DQ3, DQ11, DQ7 and DQ15 are used. In the X8 mode 130, as illustrated in (c) of FIG. 1, a total of eight DQ pads from DQ0 to DQ7 are used, that is, active. The active DQ pads are symmetrically arranged with respect to the center, being located at $(1+4k)^{th}$ positions from the center to both ends, where k is an integer from 0 to 3. For example, in the X8 mode, DQ pads DQ6, DQ2, DQ4, DQ0, DQ1, DQ5, DQ3 and DQ7 are used. In the X4 mode 140, as illustrated in (d) of FIG. 1, a total of four DQ pads from DQ0 to DQ3 are used, that is are active. The active DQ pads are symmetrically arranged with respect to the center, being located at $(1+8k)^{r1}$ positions from the center to both ends where k is 0 and 1. For example, in the X4 mode, DQ pads DQ2, DQ0, DQ1 and DQ3 are used. In the X2 mode 150, as illustrated in (e) of FIG. 1, two DQ pads DQ0 nd DQ1 are used, that is, are active. In the X1 mode 160 of (f) of FIG. 1, only DQ0 may be used, that is may be active. According to the present inventive concepts, the DQ pad mode may be freely selected from among the DQ pad modes X32 to X1 as needed on-the-fly during the use of the memory device. In some embodiments, in any of the X32, X16, X8, X4, X2, and X1 modes, the active DQ pads of the corresponding mode are arranged to have symmetrical power consumption at all times. The pad arrangement 100 of FIG. 1 illustrates that even though the thirty-two DQ pads are used in any of the X32, X16, X8, X4, X2, and X1 modes, the DQ pads used in the selected mode are symmetrically arranged to provide balanced and symmetrical power consumption.

FIG. 2 is a diagram illustrating a read operation and a write operation using four DQ pads as an example of the DQ pad organization in the X8 mode 130 according to some embodiments of the present inventive concepts.

The read operation and the write operation in the X8 mode 130 will be described with reference to (c) of FIG. 1 and FIG. 2. Thirty-two DQ pads may be divided into eight four-DQ pad groups by grouping four adjacent DQ pads into the same group. Specifically, if the sixteen DQ pads in the left half are grouped into four groups of four adjacent DQ pads, the DQ pads may be divided into four groups of four-DQ pads. That is, for example, a first four-DQ pad group 135 may consist of DQ pads DQ0, DQ16, DQ8, and DQ24; a second four-DQ pad group may consist of DQ pads DQ4, DQ20, DQ12, and DQ28; a third four-DQ pad group may consist of DQ pads DQ2, DQ18, DQ10, and DQ26; and a fourth four-DQ pad group may consist of DQ pads DQ6, DQ22, DQ14 and DQ30. Similarly, the sixteen DQ pads in the right half may be grouped into four groups of four adjacent DQ pads to form another four groups of 4-DQ pads. That is, for example, a first four-DQ pad group 135 may consist of DQ pads DQ1, DQ17, DQ9, and DQ25; a second four-DQ pad group may consist of DQ pads DQ5, DQ21, DQ13, and DQ29; a third four-DQ pad group may consist of DQ pads DQ3, DQ19, DQ11, and DQ27; and a fourth four-DQ pad group may consist of DQ pads DQ7, DQ23, DQ15 and DQ31.

According to some embodiments, for each four-DQ pad group, the input of data to be written is made through only one DQ pad of the four-DQ pad group at a specific position within each four-DQ pad group. For example, with regard to the sixteen DQ pads in the left half, the input data may be written to four DQ pads such as DQ0, DQ4, DQ2, and DQ6 at the rightmost position in each four-DQ pad group. That is, the input data may be written to the DQ pad of each four-DQ pad group having the rightmost position of the four-DQ pad group. The input data is written to the memory cells through the path corresponding to the four DQ pads belonging to the corresponding four-DQ pad group. For the sixteen DQ pads in the right half, the same cases may be applied to the four groups of four-DQ pads in consideration of symmetry with the left half. That is, for example, the input data may be written to the DQ pad of each four-DQ pad group having the left most position of the four-DQ pad group, for example, DQ pads DQ1, DQ5, DQ3 and DQ7.

For example, in the X8 mode 130, the write operation and the read operation may be divided into four cases. This will be described in detail with reference to FIG. 2. First, a first four-DQ pad group 135 consisting of four DQ pads DQ0, DQ16, DQ8, and DQ24 will be considered. As illustrated in (a) of FIG. 2, the write operation in the X8 mode may include four cases, for example, first to fourth cases CASE1, CASE2, CASE3 and CASE4, respectively. In the first case CASE1, data input to the DQ0 pad is written to the DQ0 memory cell array region. In the second case CASE2, data input to the DQ0 pad is written to the DQ8 memory cell array region. Similarly, in the third case CASE3, data input to the DQ0 pad is written to the D16 memory cell array region. In the fourth case CASE4, data input to the DQ0 pad is written to the D24 memory cell array region.

The description of the write operation in the X8 mode 130 of the first four-DQ pad group 135 may be similarly applied to each of the remaining seven four-DQ pad groups.

As illustrated in (b) of FIG. 2, the read operation in the X8 mode 130 may include four cases, for example, first to fourth cases CASE5, CASE6, CASE7 and CASE8, respectively. In the first four-DQ pad group 135, the first case (CASE5) is a case in which the data in the DQ0 memory cell array region is output to the outside through the DQ0 pad. In the second case (CASE6), the data of the DQ8 memory cell array region is output to the outside through the DQ0 pad. In the third case (CASE7), the data in the DQ16 memory cell array region is output to the outside through the DQ0 pad. In the fourth case (CASE8), the data in the DQ24 memory cell array region is output to the outside through the DQ0 pad.

The description of the read operation in the X8 mode 130 of the first four-DQ pad group 135 may be similarly applied to each of the remaining seven four-DQ pad groups.

Figure 3:
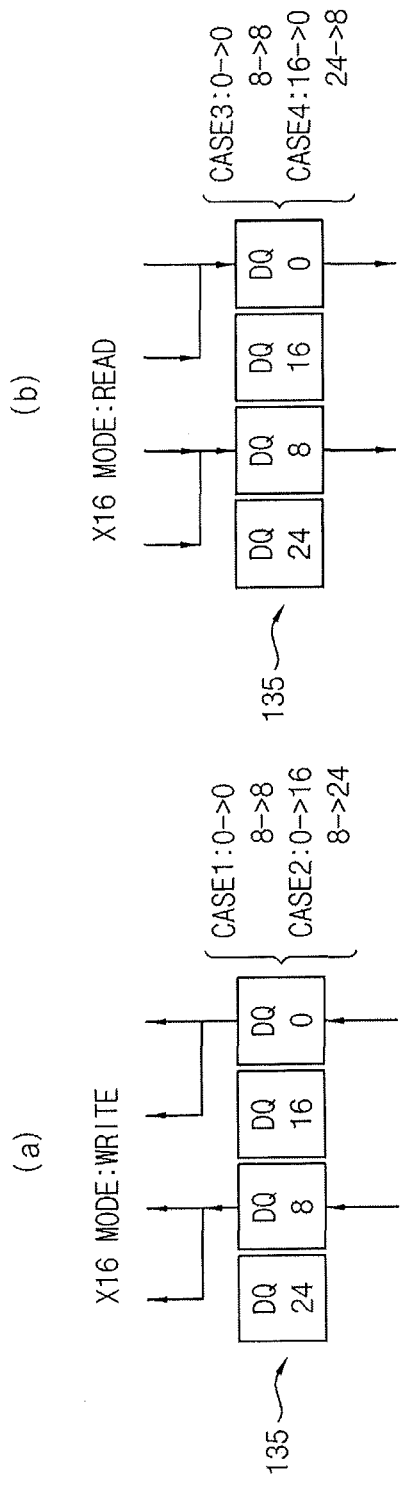
FIG. 3 illustrates two cases of a read operation and two cases of a write operation based on an example organization of four DQ pads, two of which are used for the inputting/outputting data, in accordance with some embodiments of the present inventive concepts.

FIG. 3 is a diagram illustrating the read operation and the write operation using four DQ pads as an example of the DQ pad organization in the X16 mode 120 according to some embodiments of the present inventive concepts.

The read operation and the write operation in the X16 mode 120 will be described with reference to (b) of FIG. 1 and FIG. 3. In the X16 mode 120, the read operation and the write operation may include two cases, respectively, for example, CASE1 and CASE2 in the write operation and CASE3 and CASE4 in the read operation. First, the write operation of the X16 mode 120 will be described with reference to (a) of FIG. 3. The write operation in the X16 mode 120 may include two cases in each of the eight four-DQ pad groups. In the X16 mode 120, data to be written into the memory cell array region may be input through two DQ pads for each four-DQ pad group. For example, in the case of the first four-DQ pad group 135, data may be input through DQ pads D0and DQ8. In such an embodiment, the first case CASE1 of the write operation is a case in which the data input to the DQ0 pad is written to the DQ0 memory cell array region and the data input to the DQ8 pad is written to the DQ8 memory cell array region. In the second case CASE2, the data input to the DQ0 pad is written to the DQ16 memory cell array region, and the data input to the DQ8 pad is written to the DQ24 memory cell array region.

The description of the write operation of the first four-DQ pad group 135 in the X16 mode 120 may be similarly applied to each of the remaining seven four-DQ pad groups.

Referring to (b) of FIG. 3, the read operation in the X16 mode 120 will now be described. The read operation in the X16 120 mode may also include two cases, for example, CASE3 and CASE4, in each of the eight four-DQ pad groups. In the X16 mode 120, data of four memory cell array regions corresponding to four DQ pads of each four-DQ pad group may be output to the outside via two DQ pads of each four-DQ pad group, for example DQ pads DQ0 and DQ8. For example, in the first four-DQ pad group 135, the first case CASE1 is a case in which the data in the DQ0 memory cell array region and the data in the DQ8 memory cell array region are output to the outside through the DQ0 pad and the DQ8 pad, respectively. In the second case CASE2, the data in the DQ24 memory cell array region and the data in the DQ16 memory cell array region are output to the outside through the DQ0 pad and the DQ8 pad, respectively.

Figure 4:
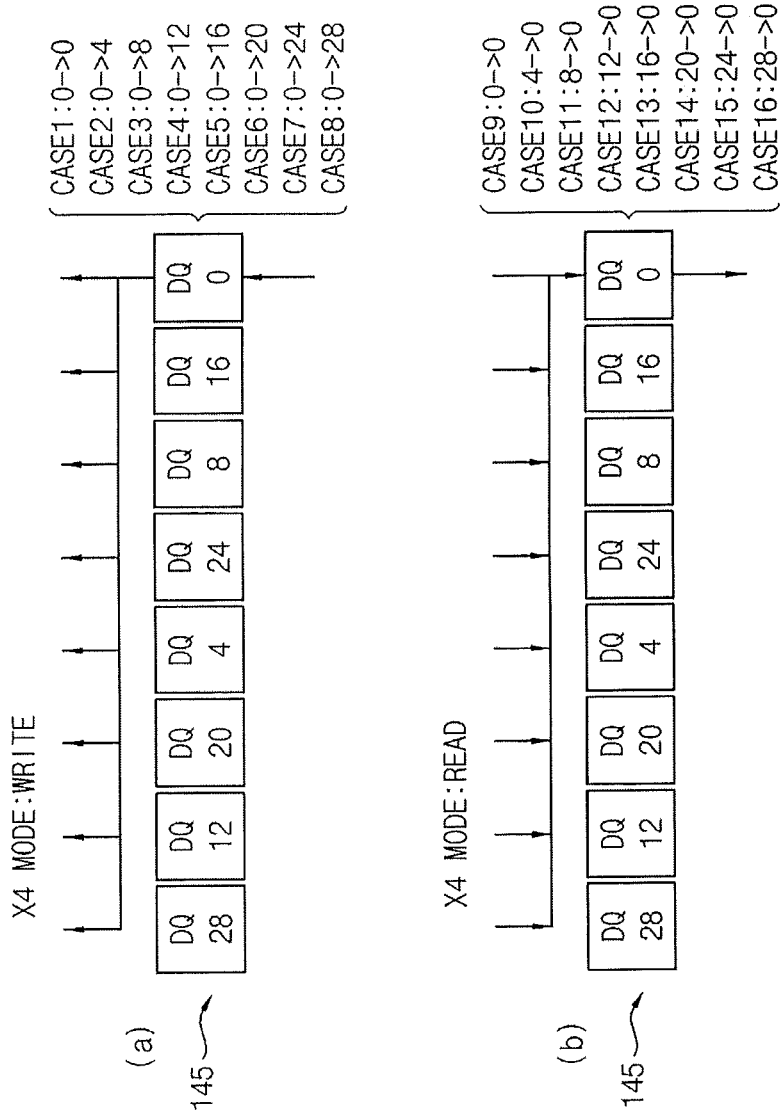
FIG. 4 illustrates eight cases of a read operation and eight cases of a write operation based on an example organization of eight DQ pads, one of which is used for inputting/outputting data, in accordance with some embodiments of the present inventive concepts.

FIG. 4 is a diagram illustrating the read operation and write operation using eight DQ pads as an example of the DQ pad organization in the X4 mode 140, according to some embodiments of the present inventive concepts.

The read operation and the write operation in the X4 mode 140 will be described with reference to (d) of FIG. 1 and FIG. 4. In the X4 mode 140, the write operation and the read operation may be performed for each of the eight-DQ pad groups in which eight adjacent DQ pads are grouped into the same group. The thirty-two DQ pads may be divided into four eight-DQ pad groups. For example, the first eight-DQ pad group 145 is a sum of the first four-DQ group 135 and the adjacent second four-DQ group, and may include eight DQ pads, that is DQ pads DQ28, DQ12, DQ20, DQ4, DQ24, DQ8, DQ16, and DQ0 pads.

The write operation in the X4 mode 140 may include eight cases for each eight-DQ pad group. The write operation in the X4 mode 140 may be performed in such a manner that data is input to a specific one DQ pad and written into eight DQ memory cell array regions. In other words, for each eight-DQ pad group, the input of data to be written is made through only one DQ pad of the eight-DQ pad group at a specific position within each eight-DQ pad group, for example, DQ pads DQ0 and DQ2 at the rightmost position of each of left two eight-DQ pad groups and DQ pads DQ1 and DQ3 at the leftmost position of each of right two eight-DQ pad groups.

The write operation in the X4 mode 140 will be described in detail with reference to (a) of FIG. 4. In the X4 mode 140, for example, the data to be written to the memory cell array region may be input through the DQ0 pad for the write operation of the first eight-DQ group 145, for example. At this time, the first case CASE1 of the write operation in the X4 mode 140 is a case in which the data input to the DQ0 pad is written to the DQ0 memory cell array region. In the second case CASE2 of the write operation in the X4 mode 140, the data input to the DQ0 pad is written to the DQ4 memory cell array region. In the third case CASE3 of the write operation in the X4 mode 140, the data input to the DQ0 pad is written to the DQ8 memory cell array region. In the fourth case CASE4 of the write operation in the X4 mode 140, the data input to the DQ0 pad is written to the DQ12 memory array cell region. In the fifth case CASE5 of the write operation in the X4 mode 140, the data input to the DQ0 pad is written to the DQ16 memory cell array region. In the sixth case CASE6 of the write operation in the X4 mode 140, the data input to the DQ0 pad is written to the DQ20 memory cell array region. In the seventh case CASE7 of the write operation in the X4 mode 140, the data input to the DQ0 pad is written to the DQ24 memory cell array region. Finally, in the eighth case CASE8 of the write operation in the X4 mode 140, the data input to the DQ0 pad is written to the DQ28 memory cell array region.

The description of the write operation of the first eight-DQ pad group 145 in the X4 mode 140 may be similarly applied to each of the remaining three eight-DQ pad groups.

The read operation in the X4 mode 140 may be performed for each of the four eight-DQ pad groups like the write operation. For each eight-DQ pad group, the read operation in the X4 mode may include eight cases, for example, CASE9, CASE10, CASE11, CASE12, CASE13, CASE14, CASE15 and CASE16. Referring to (b) of FIG. 4, the operations will be described for the first eight-DQ group 145 as an example. In the first case CASE9 of the read operation in the X4 mode 140, the data in the memory cell array region corresponding to the DQ0 pad is output through the DQ0 pad. The second case CASE10 of the read operation in the X4 mode 140 is a case in which the data in the memory cell array region corresponding to DQ4 pad is output to the outside through the DQ0 pad. In the third case CASE11 of the read operation in the X4 mode 140, the data in the memory cell array region corresponding to DQ8 pad is output through the DQ0 pad. In the fourth case CASE12 of the read operation in the X4 mode 140, the data in the memory cell array region corresponding to DQ12 pad is output to the outside through the DQ0 pad. In the fifth case CASE13 of the read operation in the X4 mode 140, the data in the memory cell array region corresponding to DQ16 pad is outputted to the outside through the DQ0 pad. In the sixth case CASE14 of the read operation in the X4 mode 140, the data in the memory cell array region corresponding to DQ20 pad is output to the outside via the DQ0 pad. In the seventh case CASE15 of the read operation in the X4 mode 140, the data in the memory cell array region corresponding to DQ24 pad is output to the outside through the DQ0 pad. In the eighth case CASE16 of the read operation in the X4 mode 140, the data in the memory cell array region corresponding to DQ28 pad is output to the outside via the DQ0 pad.

The description of the read operation in the X4 mode of the first eight-DQ pad group 145 may be similarly applied to each of the remaining three eight-DQ pad groups.

Although not shown in the drawings, it will be appreciated by those skilled in the art that the cases of write and read operations in the X2 mode 150 and the X1 mode 160 of the DQ pads can be sufficiently inferred from the cases of the other DQ pad organization modes described above.

Figure 5:
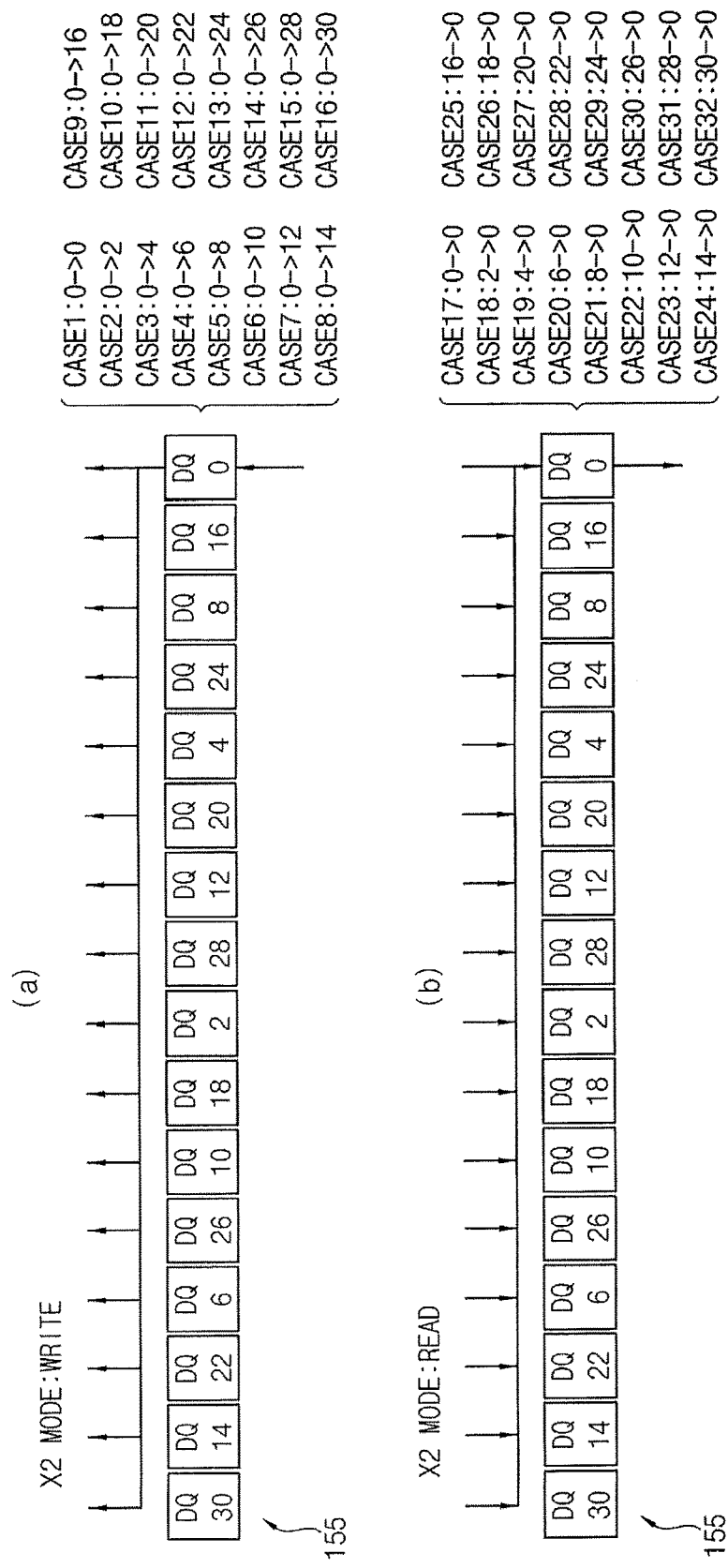
FIG. 5 illustrates sixteen cases of a read operation and sixteen cases of a write operation based on an example organization of sixteen DQ pads, one of which is used for inputting/outputting data, in accordance with some embodiments of the present inventive concepts.

FIG. 5 illustrates sixteen cases of a read operation and sixteen cases of a write operation based on an example organization of sixteen DQ pads, one of which is used for inputting/outputting data, in accordance with some embodiments of the present inventive concepts. As shown in (e) of FIG. 1, in the X2 mode 150, thirty-two DQ pads may be divided into sixteen even-numbered DQ pads and sixteen odd-numbered DQ pads. For example, in the first sixteen-DQ pad group 155 consisting of sixteen even-numbered DQ pads, namely, DQ pads DQ30, DQ14, DQ22, DQ6, DQ26, DQ10, DQ18, DQ2, DQ28, DQ12, DQ20, DQ4, DQ24, DQ8, DQ16 and DQ0, located in the left half, the write operation and the read operation may include sixteen cases, respectively. The write operation may include sixteen cases in which the data input to the DQ0 pad are written to the sixteen memory cell array regions corresponding to DQ pads DQ0, DQ2, DQ4, DQ6, DQ8, DQ10, DQ12, DQ14, DQ16, DQ18, DQ20, DQ22, DQ24, DQ26, DQ28 and DQ30, respectively, namely, CASE1-CASE16, as seen in (a) of FIG. 5. That is, the write operation may be performed in such a manner that data is input to a specific DQ pad, for example, the DQ0 pad, and written to sixteen DQ memory cell array regions. The read operation may also include sixteen cases, namely CASE17-CASE32, as seen in (b) of FIG. 5, in which the data in the sixteen memory cell array regions corresponding to DQ pads DQ0, DQ2, DQ4, DQ6, DQ8, DQ10, DQ12, DQ14, DQ16, DQ18, DQ20, DQ22, DQ24, DQ26, DQ28 and DQ30, respectively, are output to the outside through DQ0 pad. That is, the read operation may be performed in such a manner that data in the sixteen memory cell regions are output through a specific DQ pad, for example, the DQ0 pad.

The second sixteen-DQ group of the odd-numbered DQ pads, which consists of sixteen sixteen-DQ pads, namely, DQ pads DQ31, DQ15, DQ25, DQ7, DQ27, DQ11, DQ19, DQ3, DQ29, DQ13, DQ21, DQ5, DQ25, DQ9, DQ17 and DQ1, is the same as that of the first sixteen-DQ group. That is, the write operation may include sixteen cases for writing the data input to DQ1 pad to the sixteen memory cell array regions corresponding to DQ1, DQ3, DQ5, DQ7, DQ9, DQ11, DQ13, DQ15, DQ17, DQ19, DQ21, DQ23, DQ25, DQ27, DQ29 and DQ31, respectively. That is, the write operation may be performed in such a manner that data is input to a specific DQ pad, for example, the DQ1 pad, and written to sixteen DQ memory cell array regions. The read operation also may include sixteen cases for outputting the data in the sixteen memory cell array regions corresponding to DQ1, DQ3, DQ5, DQ7, DQ9, DQ11, DQ13, DQ15, DQ17, DQ19, DQ21, DQ23, DQ25, DQ27, DQ29 and DQ31, respectively, to the outside through the DQ1 pad. That is, the read operation may be performed in such a manner that data in the sixteen memory cell regions are output through a specific DQ pad, for example, the DQ1 pad.

With reference to (f) of FIG. 1, the X1 mode 160 treats thirty-two DQ pads as one group. That is, in the X1 mode 160, the write operation may include thirty-two cases in which the data input to DQ0 pad are written to 32 memory cell array regions, respectively, corresponding to DQ0, DQ1, DQ2, DQ3, DQ4, DQ5, DQ6, DQ7, DQ8, DQ9, DQ10, DQ11, DQ12, DQ13, DQ14, DQ15, DQ16, DQ17, DQ18, DQ19, DQ 20, DQ21, DQ22, DQ23, DQ24, DQ25, DQ 26, DQ27, DQ28, DQ29, DQ30 and DQ31. The read operation may also include thirty-two cases where the data in the thirty-two memory cell array regions corresponding to DQ0, DQ1, DQ2, DQ3, DQ4, DQ5, DQ6, DQ7, DQ8, DQ9, DQ10, DQ11, DQ12, DQ13, DQ14, DQ15, DQ16, DQ17, DQ18, DQ19, DQ 20, DQ21, DQ22, DQ23, DQ24, DQ25, DQ 26, DQ27, DQ28, DQ29, DQ30 and DQ31 are output to the outside through the DQ0 pad. That is, all the data is written to or read from the thirty-two memory cell array regions through a single DQ pad, for example, the DQ0 pad.

Figure 6:
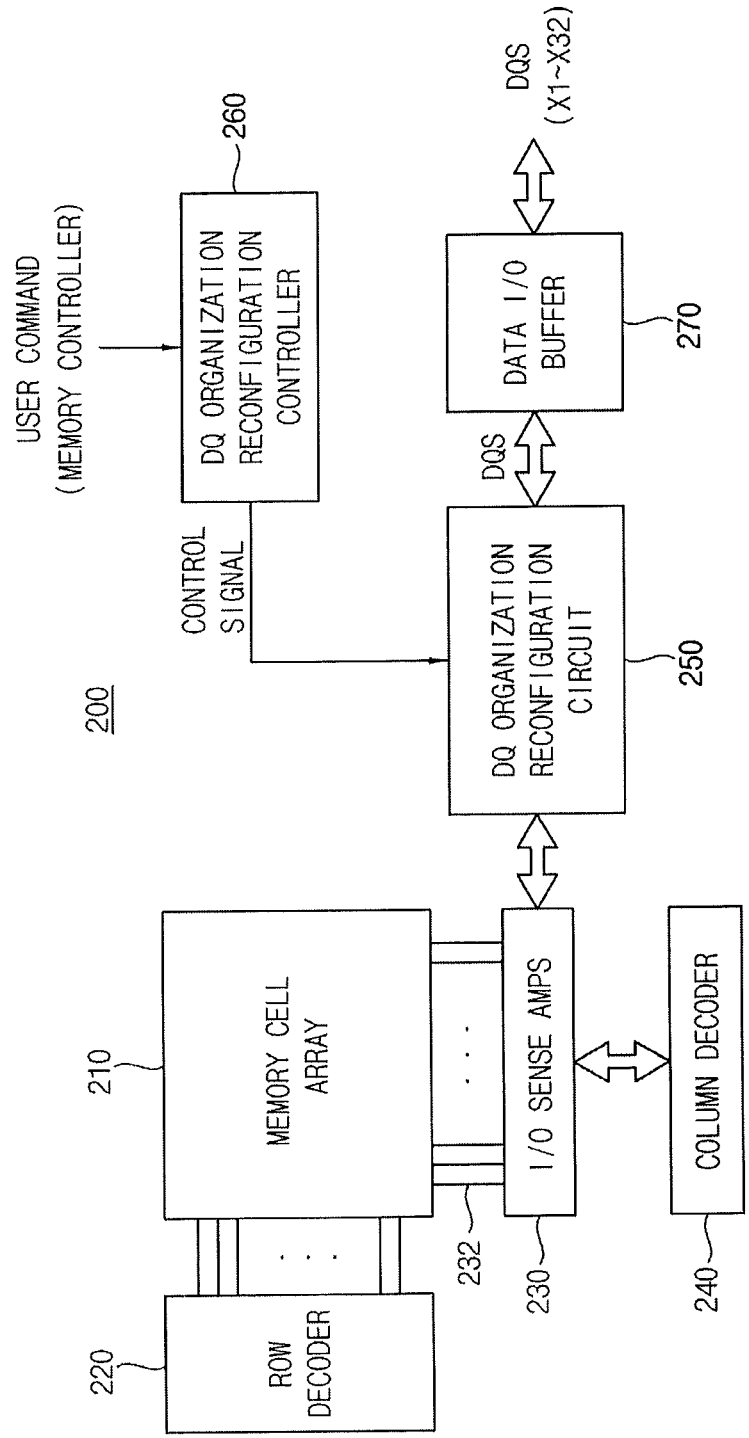
FIG. 6 is a block diagram illustrating a DRAM device which changes a DQ pad organization of the DRAM device to a desired DQ pad mode on-the-fly, in accordance with some embodiments of the present inventive concepts.

Next, FIG. 6 illustrates a block diagram of a DRAM device 200 for freely changing the DQ pad organization of a DRAM device on-the-fly to a desired DQ pad mode, for example, among X1 mode to X32 mode during use of the DRAM device, in accordance with some embodiments of the present inventive concepts.

In some embodiments, the DRAM device 200 may include a DQ organization reconfiguration circuit (or unit) 250 and a DQ organization reconfiguration controller (or control unit) 260.

The DQ organization reconfiguration control unit 260 may generate a set of control signals based on a provided user command. The control signals may be provided to the DQ organization reconfiguration unit 250 to convert the DQ organization, that is, the mode of the DQ pad, to a desired mode on-the-fly. The user command may include an instruction to configure the DQ pads in the mode desired by the user among the DQ pad modes from the X1 mode to the X32 mode, for example. This user command can be executed while using the memory device. When the control signals are provided to the DQ organization reconfiguration unit 250, the DQ organization reconfiguration unit 250 can reconfigure the current DQ organization to the DQ pad mode designated by the control signals on-the-fly.

In some embodiments, the user command may be, for example, a command provided from a memory controller of a processor (not shown). A use plan or schedule relating to the DQ pad mode of the memory device may be included as a part of a predetermined program and the program may be executed through the processor. In such an embodiment, the memory controller instructed by the processor may instruct the DQ organization reconfiguration control unit 260 to switch the DQ pad mode of the memory device according to the programmed use schedule.

The DQ organization reconfiguration unit 250 may include data transfer paths which can reconfigure the organization of the total DQ pads of the memory device into an instructed mode based on the control signals provided from the DQ organization reconfiguration control unit 260. For example, if the control signals provided from the DQ organization reconfiguration control unit 260 provide instructions to change the DQ pad mode to the X8 mode, for example, the DQ organization reconfiguration unit 250 immediately reconfigures the organization of the DQ pads into the X8 mode by changing the data transfer paths as instructed.

In general, the DRAM device 200 may include memory cell arrays 210 including large and rectangular arrays of memory cells, and support logics to be used for reading and writing data from/into the memory cell arrays 210. In general, the memory cell arrays 210 are arranged in rows and columns of memory cells called wordlines and bitlines, respectively. Each memory cell in the memory cell arrays 210 has a unique location or address defined by the intersection of a row and a column.

The support logic to be used may include a row decoder 220 and a column decoder 240 for latching and resolving the row and column addresses of the memory cell arrays 210 and for controlling the start and end of the read and write operations, an input/output sense amplifier unit 230 for amplifying an input/output signal between the memory cell arrays 210 and the column decoder 240 and connected to the memory cell arrays 210 by lines 232, and a data I/O buffer 270 for buffering input/output data. For a dynamic random access memory (DRAM), a refresh circuit may be included to maintain the integrity of the stored data. The DQ organization reconfiguration unit 250 and the DQ organization reconfiguration control unit 260 for implementing the present inventive concepts may be arranged between the input/output sense amplifier unit 230 and the data input/output buffer 270.

In order to be able to flexibly reconfigure the organization of the DQ pads to a desired DQ pad mode among, for example, the X1 to X32 modes, adjacent DQ pads may be connected to each other via a data bus, and the connection relationship between such DQ pads, that is, the data transfer paths must be variable by the control signals. A change in the connection relationship between the DQ pads may be controlled using, for example, the multiplexer and the control signals. If the data buses for connecting the adjacent DQ pads and the control signal paths are formed by limited routing layers, for example, M1 and M2 metal layers in the case of a DRAM chip, considerable overhead of memory chip size may occur. However, the data buses and control signal paths to connect the adjacent DQ pads can be formed by utilizing a routing layer of the DRAM chip such as an M3 metal layer and/or an M4 metal layer. As a result of using the M3 metal layer and/or the M4 metal layer, the data buses and control signal paths may be constructed with minimal or no overhead of memory chip size.

Figure 7:
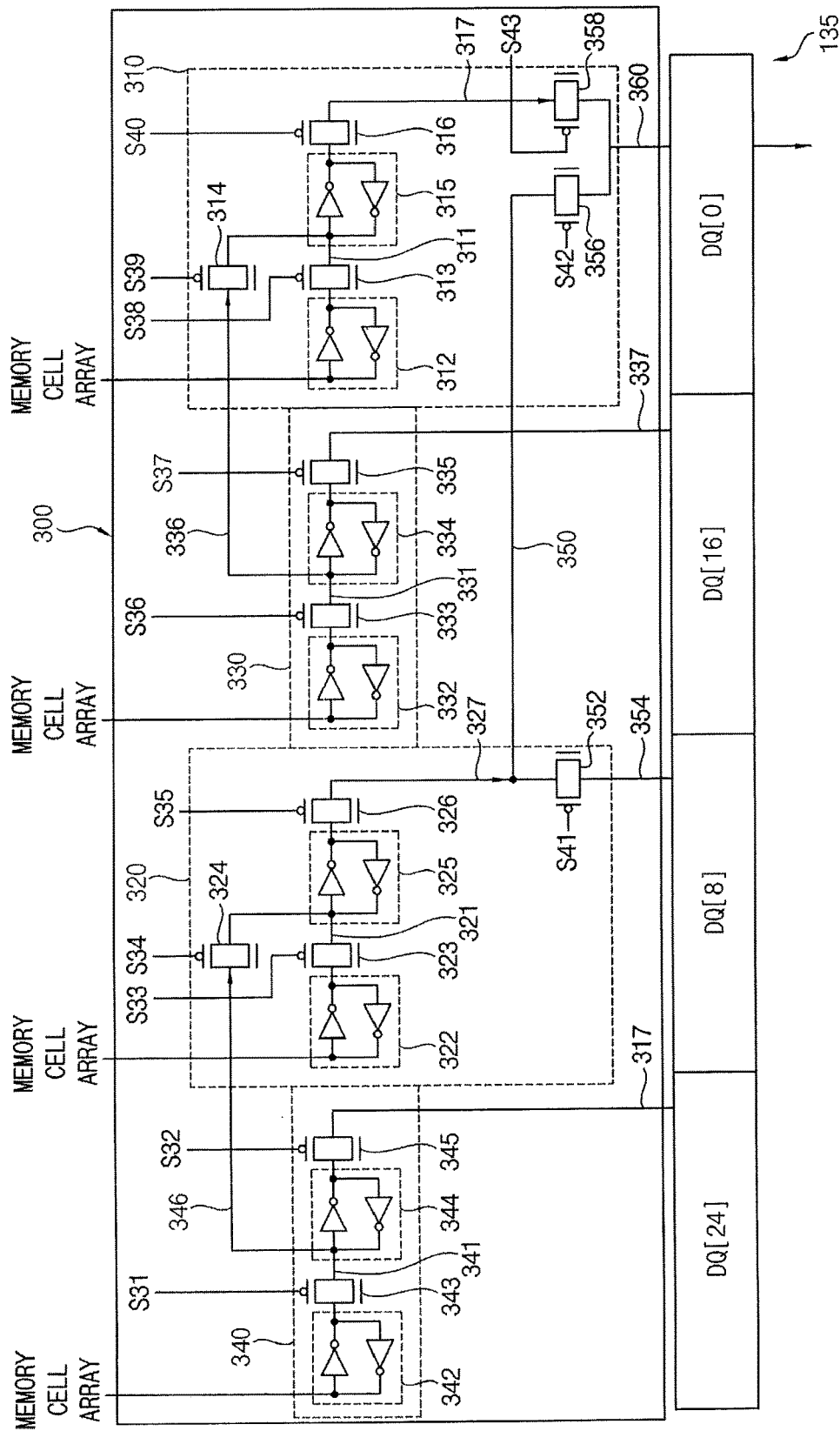
FIG. 7 is a schematic diagram illustrating a DQ pad reconfiguration unit circuit, which is a part of the DQ organization reconfiguration circuit illustrated in FIG. 6, for a read operation for one four-DQ pad group.

FIG. 7 illustrates a part of the DQ organization reconfiguration unit 250. That is, FIG. 7 is a schematic diagram illustrating a DQ pad reconfiguration unit circuit 300, which is a part of the DQ organization reconfiguration unit 250 illustrated in FIG. 6, for a read operation for one four-DQ pad group, for example, including DQ pads DQ0, DQ16, DQ8 and DQ24.

Referring to FIG. 7, the DQ organization reconfiguration unit circuit 300 for the read operation according to some embodiments may include four read DQ selection circuits 310, 320, 330, and 340. These four read DQ selection circuits 310, 320, 330 and 340 may be arranged to have a one-to-one correspondence with the four DQ pads DQ0, DQ8, DQ16 and DQ24 which are included in the first four-DQ pad group 135.

The first read DQ selection circuit 310 may be connected between the first DQ pad DQ0 and the first memory cell array region corresponding to the first DQ pad DQ0 of the first four-DQ pad group 135. The second read DQ selection circuit 330 may be connected between the second DQ pad DQ16 and the second memory cell array region corresponding to the second DQ pad DQ16 of the first four-DQ pad group 135 and between the first read DQ selection circuit 310 and the third read DQ selection circuit 320. The third read DQ selection circuit 320 may be connected between the third DQ pad DQ8 and the third memory cell array region corresponding to the third DQ pad DQ8 of the first four-DQ pad group 135 and between the second read DQ selection circuit 330 and the fourth read DQ selection circuit 340. The fourth read DQ selection circuit 340 may be connected between the fourth DQ pad DQ24 and the fourth memory cell array region corresponding to the fourth DQ pad DQ24 of the first four-DQ pad group 135. The fourth read DQ selection circuit 340 may be connected to the third read DQ selection circuit 320 adjacent thereto. The second read DQ selection circuit 330 may be connected to the first read DQ selection circuit 310 adjacent thereto. The third read DQ selection circuit 320 may also be connected to the first read DQ selection circuit 310.

According to the read DQ organization reconstruction unit circuit 300, the data output from the first memory cell array region corresponding to the first DQ pad DQ0 may always be output only through the first DQ pad DQ0 through the first read DQ selection circuit 310. The data output from the second memory cell array region corresponding to the second DQ pad DQ16 may be (i) output to the second DQ pad DQ16 via the second read DQ selection circuit 330, or (ii) transmitted to the first read DQ selection circuit 310 and output to the first DQ pad DQ0. The data output from the third memory cell array region corresponding to the third DQ pad DQ8 may be (i) output to the third DQ pad DQ8 through the third read DQ selection circuit 320, or (ii) transferred to the first read DQ selection circuit 310 through the third read DQ selection circuit 320 and then output to the first DQ pad DQ0. The data output from the fourth memory cell array region corresponding to the fourth DQ pad DQ24 may be (i) output to the fourth DQ pad DQ24 through the fourth read DQ selection circuit 340 or (ii) transferred to the third read DQ selection circuit 320 through the fourth read DQ selection circuit 340 and then output to the third DQ pad DQ8, or (iii) transferred to the fourth read DQ selection circuit 340, the third read DQ selection circuit 320, and the first read DQ selection circuit 310 in turns, and then output to the first DQ pad DQ0. The paths through which the data read from each memory cell array region can be output are thus various. That is, the read DQ organization reconstruction unit circuit 300 is configured such that the paths through which data may be output may be variable. As a result, the output path of the data read from each memory cell array region may be flexibly on-the-fly controlled based on the control signals provided from the DQ organization reconfiguration control unit 260 during use of the memory device.

Some embodiments, the first read DQ selection circuit 310 may include a first latch 312, bus line selectors 313 and 314, a second latch 315, and a timing control gate 316. The first read DQ selection circuit 310 may further include two transmission gates 356 and 358. The first latch 312 may be connected to the first memory cell array region corresponding to DQ0. The data in the first memory cell array region corresponding to DQ0 is input through the first latch 312. The bus line selectors 313 and 314 may include, for example, two transmission gates. One transmission gate 313 may be disposed on the bus line 311 so as to turn on/off (that is, connect/disconnect) the bus line 311 between the first latch 312 and the second latch 315. That is, the transmission gate 313 may allow or disallow the data from the first memory cell array region corresponding to the DQ0 pad to be transferred to the DQ0 pad. The other transmission gate 314 may be disposed on the bus line 336 so as to turn on/off (that is, connect/disconnect) a bus line 336 between the input terminal of a second latch 334 of the second read DQ selection circuit 330 adjacent to the first read DQ selection circuit 310 and the input terminal of the second latch 315 of the first read DQ selection circuit 310. That is, the transmission gate 314 may allow or disallow the data read from the second memory cell array region corresponding to the second DQ pad DQ16 pad and then transferred to the second read DQ selection circuit 330 to be transferred to the first read DQ selection circuit 310. Accordingly, the data read from the second memory cell array region corresponding to the third DQ pad DQ16 may be transferred to the first read DQ selection circuit 310 through the second read DQ selection circuit 330 to be output to the first DQ pad DQ0. The timing control gate 316 may be coupled to the output of the second latch 315. The output data of the first read DQ selection circuit 310 can be obtained through the timing control gate 316. The timing control gate 316 may be connected to DQ0 pad via the transmission gate 358 and such connection may be made via bus lines 317 and 360. That is, the transmission gate 358 may be connected to the timing control gate 316 via the bus line 317 and connected to the DQ pad DQ0 via the bus line 360. In addition, the latch 326 of the third read DQ selection circuit 320 may be connected to the transfer gate 356 of the first read DQ selection circuit 320 through the bus line 350. The data read from the third memory cell array region corresponding to the third DQ pad DQ8 may be transferred to the transmission gate 356 of the first read DQ selection circuit 310 through the bus line 350 via the third read DQ selection circuit 320 (Details of this will be described below). The data read from the fourth memory cell array region corresponding to the fourth DQ pad DQ24 may be transferred to the third read DQ selection circuit 320 through the fourth read DQ selection circuit 340, where the transferred data may be output to the third DQ pad DQ8 or transferred to the transmission gate 356 of the first read DQ select circuit 310 via the bus line 350 (Details of this will be described later).

In some embodiments, the second read DQ selection circuit 330 may include a third latch 332, a transmission gate 333, a fourth latch 334 and a timing control gate 335. The third latch 332 may be connected to a second memory cell array region corresponding to the second DQ pad DQ16. The data in the second memory cell array region corresponding to the second DQ pad DQ16 may be input through the third latch 332. A transmission gate 333 may be disposed on a bus line 331 connecting the fourth latch 334 and the third latch 332. The fourth latch 334 can be connected to or disconnected from the third latch 332 by turning on/off the transmission gate 333. The transmission gate 333 may also be connected to the transmission gate 314 of the first read DQ selection circuit 310 through the bus lines 331 and 336 so that the data of the second read DQ selection circuit 330 can be transferred to the first read DQ selection circuit 310. The timing control gate 335 connected to the output terminal of the fourth latch 334 may be connected to the DQ 16 via a bus line 337. As such, the second read DQ selection circuit 330 may transfer the data read from the second memory cell array region directly to the second DQ pad DQ16 via the bus line 337 and indirectly to the first DQ pad DQ0 via the bus line 336 and the first read DQ selection circuit 310.

The elements 321, 322, 323, 324, 325, 326, 327, and 352 of the third read DQ selection circuit 320 correspond to the elements 311, 312, 313, 314, 315, 316, 317, and 358, respectively, and the connection relationship there between is substantially the same. In detail, the third read DQ selection circuit 320 may include a fifth latch 322, a transmission gate 323, a sixth latch 325, and a transmission gate 326 connected in series from the third memory cell array region corresponding to the third DQ pad DQ8 through a bus line 321. The third read DQ selection circuit 320 may also include a transmission gate 352 connected between the transmission gate 326 and the third DQ pad DQ8 via bus lines 327 and 354. That is, the transmission gate 352 may be connected to the transmission gate 326 via the bus line 327 and connected to the third DQ pad DQ8 via the bus line 354. A transmission gate 324 may be connected between a transmission gate 343 of the fourth read DQ select circuit 340 and the input terminal of the sixth latch 325. As such, the third read DQ selection circuit 320 may transfer the data read from the third memory cell array region directly to the third DQ pad DQ8 via the bus line 354 and indirectly to the first DQ pad DQ0 via the bus line 350 and the first read DQ selection circuit 310.

The elements 341, 342, 343, 344, 345, 346 and 347 of the fourth read DQ selection circuit 340 correspond to the elements 331, 332, 333, 334, 335, 336, and 337 respectively, and the connection relationship there between is substantially the same. Specifically, the fourth read DQ selection circuit 340 may include a seventh latch 342, a transmission gate 343, an eighth latch 344, and a timing control gate 345, which are connected in series through the bus line 341 from the fourth memory cell array region corresponding to the fourth DQ pad DQ24. The timing control gate 345 may be connected to the fourth DQ pad DQ24 via the bus line 317. The input terminal of the eighth latch 344 may be connected to the transmission gate 324 of the third read DQ selection circuit 320 via the bus line 346. The fourth read DQ selection circuit 340 may transfer the data read from the fourth memory cell array region directly to the fourth DQ pad DQ24 via the bus line 317, indirectly to the third DQ pad DQ8 via the bus line 346 and the third read DQ selection circuit 320, and indirectly to the first DQ pad DQ0 via the bus line 346, the third read DQ selection circuit 320 and the first read DQ selection circuit 310.

Control signals S31, S32, S33, S34, S35, S36, S37, S38, S39, S40, S41, S42 and S43 are applied to transmission gates 343, 345, 323, 324, 326, 333, 335, 313, 314, 316, 352, 356 and 358, respectively, in order to control the first through fourth read DQ selection circuits 310, 330, 320 and 340 based on the mode selected by a user.

As described above, the read DQ organization reconfiguration unit circuit 300 shown in FIG. 7 further includes the bus lines 336, 346 and 350 and the transmission gates 314, 324 and 356, which can allow the data read out from the second to fourth memory cell array regions respectively corresponding to the second to fourth DQ pads DQ16, DQ8 and DQ24 to be easily transferred to the adjacent DQ pad according to the user's need. According to the read DQ organization reconfiguration unit circuit 300, the data read from the first to fourth memory cell array regions may be output to the first through fourth DQ pads DQ0, DQ8, DQ16, and DQ24 through the first to fourth read DQ selection circuits 310, 330, 320, and 340, respectively (refer to the X32mode for the read operation). According to the read DQ organization reconfiguration unit circuit 300, only two DQ pads DQ0 and DQ8 out of the four DQ pads DQ0, DQ8, DQ6 and DQ24 may be used for data output. That is, through the data transfer between the adjacent read DQ selection circuits described above, the data read from the first and second memory cell array regions may be output only to the first DQ pad DQ0, and the data read from the third and fourth memory cell array regions may be output only to the third DQ pad DQ8 (refer to the X16 mode for the read operation). As another example, according to the read DQ organization reconfiguration unit circuit 300, only one DQ pad DQ0 among the four DQ pads DQ0, DQ8, DQ16, and DQ24 may be used for data output. That is, the data read from the first to fourth memory cell array regions may be output to the first DQ pad DQ0 only through the data transfer between the read DQ selection circuits described above (refer to X8 mode for the read operation). With such features of the read DQ organization reconfiguration unit circuit 300, the data transfer paths for the read operation between the memory cell array regions and the DQ pads may be flexibly changed on-the-fly. That is, the DQ organization may be flexibly changed on-the-fly, that is, while the device is in use, through the connection between adjacent DQ pads in the DQ pad configuration shown in FIG. 1, and the efficiency of the change of the DQ pad mode may be increased.

In the some embodiments, the read DQ organization reconfiguration unit circuit 300 shown in FIG. 7 may be provided for each four-DQ pad group including four adjacent DQ pads. That is, thirty-two DQ pads may be divided into eight four-DQ pad groups, and the read DQ organization reconfiguration unit circuit 300 may be provided for each four-DQ pad group, so that a total of eight read DQ organization reconfiguration unit circuits 300 can be provided. According to this, the user can select a desired DQ pad mode for the read operation among the X32, X16, X8, X4, X2, and X1 modes, for example, for the thirty-two DQ pads whenever necessary, and in response to the user selection the DQ pad organization of the thirty-two DQ pad can be reconfigured in the selected DQ pad mode on-the-fly. That is, it is possible to change flexibly from one DQ pad mode to another DQ pad mode immediately whenever desired.

Figure 8:
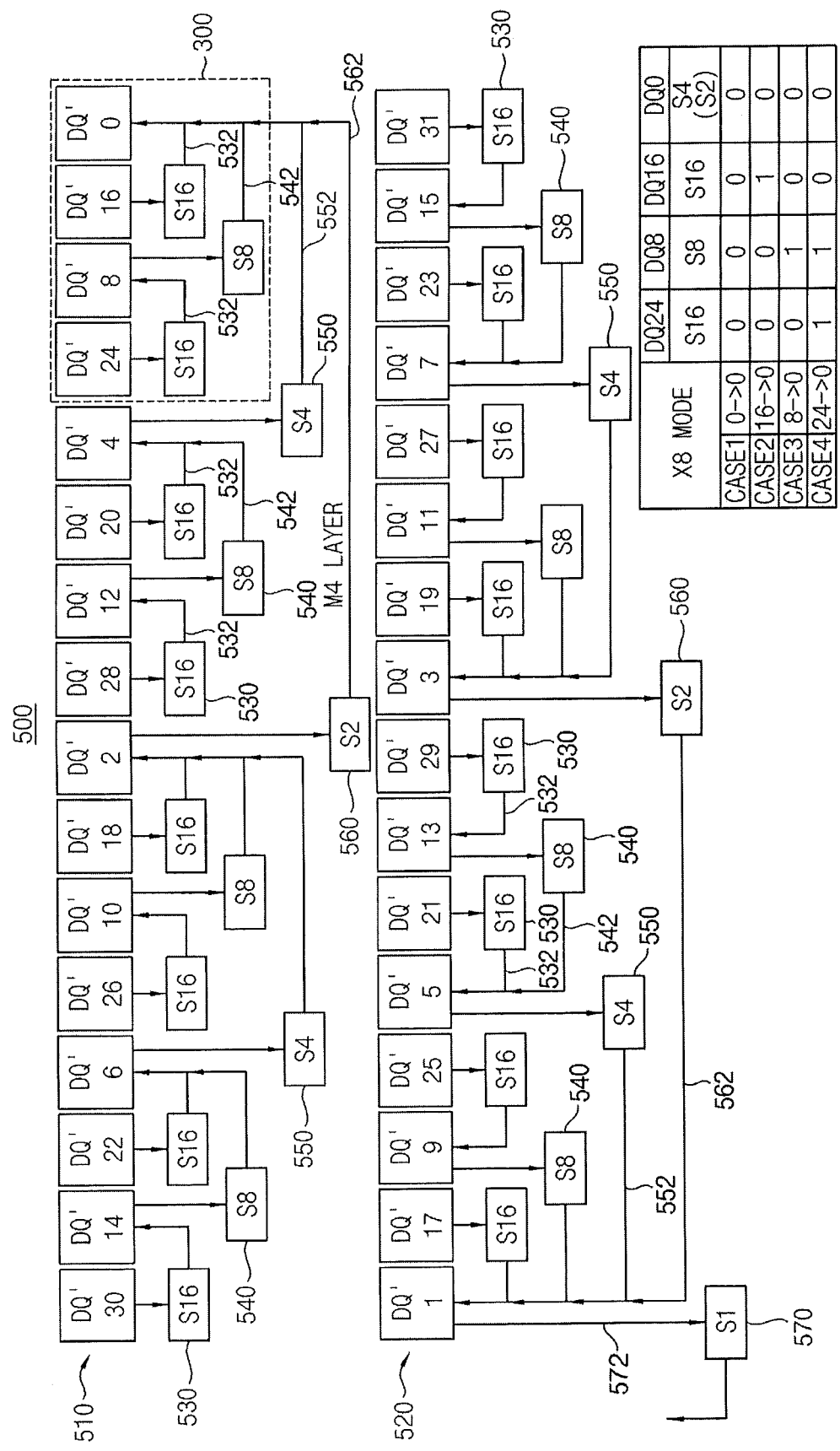
FIG. 8 is a conceptual diagram illustrating a configuration of a DQ reconfiguration circuit for reconfiguring the DQ pads shown in FIG. 1 on-the-fly into a desired DQ mode, in accordance with some embodiments of the present inventive concepts.

FIG. 8 conceptually illustrates a configuration of a read DQ organization reconfiguration circuit 500 for reconfiguring the DQ pads shown in FIG. 1 in a desired DQ mode among the DQ pad modes X32, X16, X8, X4, X2, and X1 for the read operation on-the-fly. The read DQ organization reconfiguration circuit 500 may be included as part of the DQ organization reconfiguration unit 250 shown in FIG. 6. In FIG. 8, DQ'30, DQ'14, DQ'22, DQ'6, DQ'26, DQ'10, DQ'18, DQ'2, DQ'28, DQ'12, DQ'20, DQ'4, DQ'24, DQ'8, DQ'16 and DQ'0 represent read DQ selection circuits 510 for corresponding pads DQ30, DQ14, DQ22, DQ6, DQ26, DQ10, DQ18, DQ2, DQ28, DQ12, DQ20, DQ4, DQ24, DQ8, DQ16 and DQ0 and DQ'31, DQ'15, DQ'23, DQ'7, DQ'27, DQ'11, DQ'19, DQ'3, DQ'29, DQ'13, DQ'21, DQ'5, DQ'25, DQ'9, DQ'17 and DQ'1 represent read DQ selection circuits 520 for corresponding pads DQ31, DQ15, DQ23, DQ7, DQ27, DQ11, DQ19, DQ3, DQ29, DQ13, DQ21, DQ5, DQ25, DQ9, DQ17 and DQ1. In some embodiments, as shown in FIG. 8, to configure thirty-two DQ pads into an X16 mode in which only half of the thirty-two DQ pads, that is, sixteen DQ pads of DQ0, DQ1, DQ2, DQ15 pads are used for operation, a switching unit 530 may be added to every two read DQ selection circuits 510/520 corresponding to two adjacent DQ pads. The switching unit 530 may perform switching control for connecting or disconnecting two read DQ selection circuits 510/520 connected to the switching unit 530. In the figure, 'S16' in the box corresponds to the switching unit 530. According to some embodiments, the switching unit 530 may include a bus line 532 for connecting two adjacent read DQ selection circuits 510/520 to each other, and a switching element for switching a connection (ON) and disconnection (OFF) of the bus line 532. For example, the read DQ selection circuit DQ'0 corresponding to the DQ pad DQ0 and the read DQ selection circuit DQ'16 corresponding to the DQ pad DQ16 adjacent thereto may be connected by the switching unit 530.

In this manner, the read DQ selection circuits 510/520 corresponding to the remaining DQ pads may be paired with each other by two adjacent ones, and two adjacent read DQ selection circuits of each pair may be connected to each other by the switching unit 530. A total of sixteen switching units 530 may be added for this connection. In FIG. 7, for example, a bus line 336 for connecting the first read DQ selection circuit 310 corresponding to the DQ0 pad and the second read DQ selection circuit 330 corresponding to the adjacent the DQ16 pad, and a transmission gate 344, disposed on the bus line 336, for switching connection and disconnection of the bus line 336 may be an example of the switching unit 530. For the third and fourth read DQ selection circuits 320 and 340 corresponding to the adjacent DQ8 pad and the DQ24 pad, the bus line 346 and the transmission gate 324 disposed on the bus line 346 can be an example of the switching unit 530.

According to some embodiments, in order to configure the thirty-two DQ pads into the X8 mode in which only eight DQ pads, that is, DQ0, DQ1, DQ2, . . . , DQ7 pads that are one fourth of the thirty-two DQ pads are used for operation, a switching unit 540 may be added to every pair of two read DQ selection circuits 510/520 corresponding to two adjacent DQ pads, in addition to the addition of sixteen switching units 530 for the X16 mode organization. The switching unit 540 may include a bus line 542 for connecting a pair of two read DQ selection circuits 510/520 and a switching device for switching connection (ON) and disconnection (OFF) of the bus line 542. The switching unit 540 may switch connection (ON) and disconnection (OFF) between the two pairs of the read DQ selection circuits 510/520 connected thereto.

The switching unit 540 is indicated as 'S8' in the drawing. For example, the switching unit 540 may be added between the read DQ selection circuit DQ'8 corresponding to the DQ8 pad representing the pair of the DQ8 pad and the DQ24 pad and the read DQ selection circuit DQ'0 corresponding to the DQ0 pad representing the pair of the DQ0 pad and the DQ16 pad to switch the connection (ON) and disconnection (OFF) there between. In some embodiments, the switching unit 540 may include the bus line 350 for connecting the third read DQ selection circuit 320 and the first read DQ selection circuit 310 to each other, and a transmission gate 356, being provided on the bus line 350, for switching the connection and disconnection of the bus line 350.

The circuit indicated by reference numeral 300 in FIG. 7 may be an example embodiment of the circuit indicated by reference numeral 300 in the right upper end of FIG. 8. In this manner, the switching unit 540 can be added to the read DQ selection circuits corresponding to the remaining DQ pads. A total of eight switching units 540 may be added for this connection.

In some embodiments, in order to configure the thirty-two DQ pads into the X4 mode in which only four DQ pads, that is, DQ0, DQ1, DQ2, DQ3 pads that are one eighth of the 32 DQ pads are used for operation, a switching unit 550 may be added to every two adjacent four-DQ pad groups, in addition to the addition of sixteen switching units 530 for the X16 mode organization and eight switching units 540 for the X8 mode organization. The switching unit 550 is indicated as 'S4' in the drawings. For example, the switching unit 550 may be added between the read DQ selection circuit DQ'0 corresponding to the DQ0 pad representing the first four-DQ pad group including the DQ0, DQ16, DQ8, and DQ24 pads and the read DQ selection DQ'4 corresponding to the DQ4 pad representing the second four-DQ pad group including DQ4, DQ20, DQ12, and DQ28 pads to switch the connection and disconnection between the read DQ selection circuit DQ'0 and the read DQ selection DQ'4. In this manner, the switching unit 550 may be added to the read DQ selection circuits 510/520 corresponding to the remaining DQ pads. The switching unit 550 may also include a bus line 552 for connecting two read DQ selection circuits, and a switching element disposed on the bus line 552 for switching connection (ON) and disconnection (OFF) of the bus part 552. The switching unit may be implemented as a transmission gate, for example. A total of four switching units 550 may be added for this connection.

In some embodiments, to configure the thirty-two DQ pads into the X2 mode in which only two DQ pads, that is, DQ0 and DQ1 pads that are one sixteenth of the thirty-two DQ pads are used for operation, a switching unit 560 may be added to every two adjacent eight-DQ pad groups, in addition to the addition of sixteen switching units 530 for the X16 mode organization, eight switching units 540 for the X8 mode organization, and four switching units 550 for the X4 mode organization. The switching unit 560 is indicated as 'S2' in the drawings. For example, the switching unit 560 may be added between the read DQ selection circuit DQ'0 corresponding to the DQ0 pad representing the first eight-DQ pad group including DQ0, DQ16, DQ8, DQ24, DQ4, DQ20, DQ12, and DQ28 pads and the read DQ selection DQ'2 corresponding to the DQ2 pad representing the second eight-DQ pad group including DQ2, DQ18, DQ10, DQ26, DQ6, DQ22, DQ14 and DQ30 pads to switch the connection and disconnection between the read DQ selection circuit DQ'0 of the DQ0 pad and the read DQ selection DQ'2 of the DQ2 pad. The switching unit 560 may also be added between the read DQ selection circuit DQ'1 corresponding to the DQ1 pad representing the third eight-DQ pad group including DQ1, DQ17, DQ9, DQ25, DQ5, DQ21, DQ13 and DQ29 pads and the read DQ selection DQ'3 corresponding to the DQ3 pad representing the fourth eight-DQ pad group including DQ3, DQ19, DQ11, DQ27, DQ7, DQ23, DQ15 and DQ31 pads. The switching unit 560 may include a bus line 562 for connecting two read DQ selection circuits 510/520 and a switching element (not shown) disposed on the bus line 562 for switching connection and disconnection of the bus line 562. The switching element may be implemented as a transmission gate, for example. A total of two switching units 560 may be added for the X2 mode organization.

In some embodiments, to configure the thirty-two DQ pads into the X1 mode in which only one DQ pad, for example, the DQ1 pad that is ⅟32th of thirty-two DQ pads is used for operation, a switching unit 570 may be added, in addition to the addition of sixteen switching units 530 for the X16 mode organization, eight switching units 540 for the X8 mode organization, four switching units 550 for the X4 mode organization, and two switching units 560 for the X2 mode organization. The switching unit 570 is indicated as 'S1' in the drawings. For example, the switching unit 570 may be added to the read DQ selection circuit DQ'1 corresponding to the DQ1 pad. The switching unit 570 may include a bus line 572 connected to the read DQ selection circuit DQ'1 corresponding to the DQ1 pad and a switching element (not shown) disposed on the bus line 572 for switching connection and disconnection of the bus line 572. Alternatively, the switching unit 570 may be added to the read DQ selection circuit DQ'0 corresponding to the DQ0 pad, for example.

Next, FIGS. 9A to 9D illustrate a portion of a switch control logic needed to reconfigure the thirty-two DQ pads on-the-fly in the desired mode among the X32, X16, X8, X4, X2, and X1 modes for the read operation.

The switch control logic shown in FIGS. 9A to 9D is the switch control logic for sixteen even-numbered DQ pads. Substantially the same switch control logic may be applied to the remaining sixteen odd-numbered DQ pads, and a description thereof will be omitted here. The switching control signals for executing the switch control logic of FIGS. 9A to 9D may be generated by the DQ organization reconfiguration control unit 260 shown in FIG. 6 and provided to the DQ organization reconfiguration unit 250. That is, whenever the DQ pad mode is to be changed, the user command for that may be sent to the DQ organization reconfiguration control unit 260 shown in FIG. 6. Upon receiving the user command, the DQ organization reconfiguration control unit 260 immediately generates switching control signals for reconfiguring the DQ pad mode corresponding to the instructed command based on the switch control logic shown in FIGS. 9A to 9D, and provides the DQ organization reconfiguration unit 250 with the switching control signals. Thereby, the organization mode of the DQ pads can be switched to the instructed mode on-the-fly.

Referring to the read DQ organization reorganization unit circuit 300 shown in FIG. 7, the read DQ organization reorganization circuit 500 shown in FIG. 8, and the switch control logic shown in FIGS. 9A to 9D, changing the organization of the DQ pads to a desired mode for the read operation on-the-fly will be described in more detail.

First, a method of reconfiguring the thirty-two DQ pads in the X8 mode for the read operation will be described. For example, the switching control logic for the first four-DQ pad group including DQ0, DQ16, DQ8, and DQ24 pads for reconfiguring in the X8 mode is shown in tabular form in the bottom right of FIG. 8. In the X8 mode, there are four cases for the read operation as described above, for example CASE1, CASE2, CASE3 and CASE4.

CASE1 is a case in which the data in the memory cell array region corresponding to the DQ0 pad is output to the outside through the DQ0 pad. To do this, the two switching units 530 (S16) for the X16 mode and the switching units 540 (S8) for the X8 mode, which are associated with the first four-DQ pad group, need to be turned off. In addition, it is required that the switching unit 550 for the X4 mode and the switching units 560 and 570 for the X2 and X1 modes, which are provided in the read DQ organization reconfiguration circuit 500, also should be turned off. That is, for this the DQ organization reconfiguration control unit 260 can provide switching control signals of logic 0 to all of these switching units, namely, switching units 530, 540, 550, 560 and 570.

CASE2 is a case in which the data in a memory cell array region corresponding to the DQ16 pad is output to the outside through the DQ0 pad. For this case, the data in the memory cell array region corresponding to the DQ16 pad needs to be transferred from the read DQ selection circuit DQ'16 corresponding to the DQ16 pad to the read DQ selection circuit DQ'0 corresponding to the DQ0 pad. Therefore, only one switching unit, namely switching unit 530 (S16), connecting the two read DQ selection circuits DQ'0 and DQ'16 is controlled to be turned on, whereas all the remaining switching units, namely switching units 540, 550, 560 and 570, are controlled to be turned off.

CASE3 is a case in which the data in a memory cell array region corresponding to the DQ8 pad is output to the outside through the DQ0 pad. For this case, the data in the memory cell array region corresponding to the DQ8 pad needs to be transferred from the read DQ selection circuit DQ'8 corresponding to the DQ8 pad to the read DQ selection circuit DQ'0 corresponding to the DQ0 pad. Therefore, only one switching unit, namely switching unit 540 (S8), for connecting these two read DQ selection circuits DQ'0 and DQ'8 should be turned on. The remaining switching units, that is, the switching unit 530 (S16) for the X16 mode associated with the first four-DQ pad group, the switching unit 550 (S4)

for the X4 mode provided in the read DQ organization reconfiguration circuit 500, and the switching units 560 and 570 (S2 and S1) for the X2 and X1 modes need to be controlled to be in the OFF state, respectively. The DQ organization reconfiguration control unit 260 provides signals for such switching control.

CASE4 is a case in which the data in the memory cell array region corresponding to the DQ24 pad is output to the outside via the DQ0 pad. In this case, the data in the memory cell array region corresponding to the DQ24 pad needs to be transferred from the read DQ selection circuit DQ'24 corresponding to the DQ24 pad to the read DQ selection circuit DQ'8 corresponding to the DQ8 pad. In addition, the data transferred to the read DQ selection circuit DQ'8 corresponding to the DQ8 pad needs to be transferred to the read DQ selection circuit DQ'0 corresponding to the DQ0 pad. Thus, a switching unit 540 (S8) for connecting the two read DQ selection circuits DQ'0 and DQ'8 and a switching unit 530 (S16) for connecting the two read DQ selection circuits DQ'24 and DQ'8 need to be turned ON, respectively. The switching unit 530 (S16) for the X16 mode associated with the first four-DQ pad group, the switching unit 550 (S4) for the X4 mode provided in the read DQ organization reconfiguration circuit 500, and the switching units 560 and 570 for the X2 and X1 modes need to be controlled to be in an OFF state. The DQ organization reconfiguration control unit 260 provides a signal for such switching control.

Such control logic described above can be applied to the remaining DQ pads in the same manner. That is, the DQ organization reconfiguration control unit 260 divides the remaining DQ pads into one or more four-DQ pad groups in the manner that four adjacent DQ pads belong to the same group and generates switching control signals for each four-DQ pad group based on the same switching control logic as the switching control logic applied to the first four-DQ pad group. And, the DQ organization reconfiguration control unit 260 provides the generated switching control signals to the DQ organization reconfiguration circuit 250. Through this, the thirty-two DQ pads can be reconfigured in the X8 mode to perform the read operation. The switching control signals provided by the DQ organization reconfiguration control unit 260 to the DQ organization reconfiguration circuit 250 may include the switching control signals S38, S39, S40, S36, S37, S33, S34, S35, S31, S32, S41, S42, and S43 for switching ON/OFF of a plurality of transmission gates 313, 314, 316, 333, 335, 323, 324, 326, 343, 345, 352, 356, and 358 shown in FIG. 7. The person of ordinary skill in the art will also be able to determine the configuration of the switching control signals to be provided to these multiple transfer gates based on the switching control logic shown in FIGS. 9A to 9D.

FIGS. 9A to 9D show the switching control logic for the read operations not only in the X8 mode, but also in the X32, X16, X4, X2, and X1 modes. Specifically, FIG. 9A illustrates the switching control logic for the read operation of DQ pads DQ28, DQ12, DQ20, DQ4, DQ24, DQ8, DQ16 and DQ0 in the DQ pad modes X32, X16, X8, X4 and X2, FIG. 9B illustrates the switching control logic for the read operation of DQ pads DQ30, DQ14, DQ22, DQ6, DQ26, DQ10, DQ18 and DQ2 in the DQ pad modes X32, X16, X8, X4 and X2, FIG. 9C illustrates the switching control logic for the read operation of DQ pads DQ30, DQ14, DQ22, DQ6, DQ26, DQ10, DQ18 and DQ2 in the DQ pad mode X1, and FIG. 9D illustrates the switching control logic for the read operation of DQ pads DQ38, DQ12, DQ20, DQ4, DQ24, DQ8, DQ16 and DQ0 in the DQ pad mode X1. Based on the above description of the operation of the switching control logic related to the X8 mode, the switching control for the read operation in these remaining X32, X16, X4, X2, and X1 modes may be easily understood, and a description thereof will be omitted.

Figure 10:
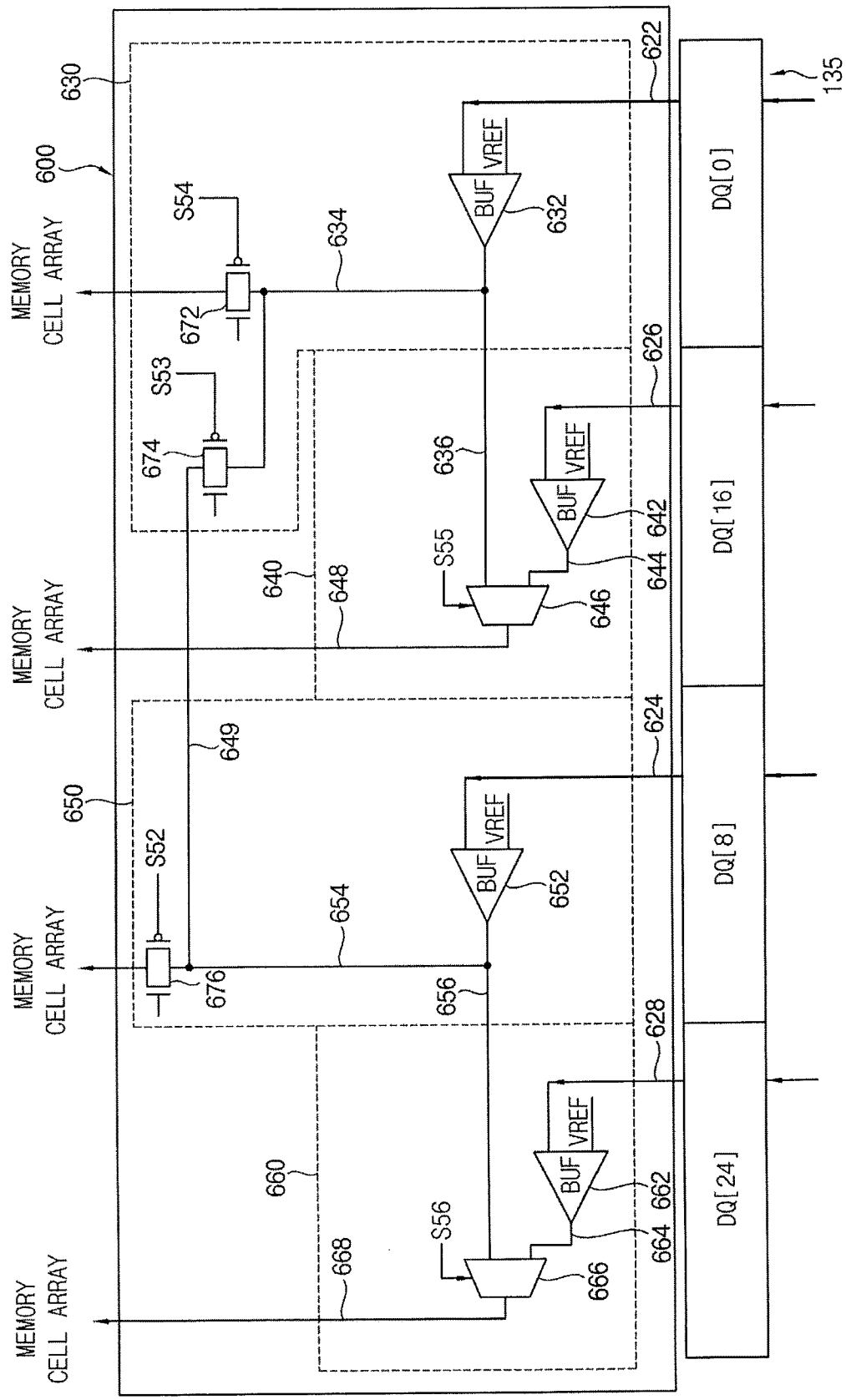
FIG. 10 is a schematic diagram illustrating a configuration of a DQ organization reconfiguration unit circuit for a write operation for one four-DQ pad group, in accordance with some embodiments of the present inventive concepts.

Next, FIG. 10, corresponding to FIG. 7, illustrates the configuration of a write DQ organization reconfiguration unit circuit 600 for one four-DQ pad group. The write DQ organization reorganization unit circuit 600 may also be included as part of the DQ organization reconfiguration unit 250.

Referring to FIG. 10, the write DQ organization reorganization unit circuit 600 according to some embodiments may include four write memory cell array selection circuits 630, 640, 650, and 660. These four write memory cell array selection circuits 630, 640, 650 and 660 may be arranged so as to have a one-to-one correspondence with the four DQ pads DQ0, DQ16, DQ8, and DQ24 included in the first four-DQ pad group 135.

In some embodiments, the first write memory cell array selection circuit 630 may include a buffer 632, connected to the first DQ pad DQ0 by a bus line 622, for buffering data input through the first DQ pad DQ0 from the outside, a bus line 634 for connecting the buffer 632 to a memory cell array region corresponding to the first DQ pad DQ0, and a timing gate 672 disposed on the bus line 634 for switch-controlling whether or not the data from the buffer 632 should be transferred to the first memory cell array region corresponding to the first DQ pad DQ0. The buffer 632 receives a reference voltage VREF. The first write memory cell array selection circuit 630 may also include a bus line 649 for connecting the output terminal of the buffer 632 of the first write memory cell array selection circuit 630 and the input terminal of a timing gate 676 of the third write memory cell array selection circuit 650, and a transmission gate 674 disposed on the bus line 649, for switch-controlling whether or not the data from the buffer 632 should be transferred to the third write memory cell array selection circuit 650.

In some embodiments, the second write memory cell array selection circuit 640 may include a buffer 642, a selection unit 646, and a bus line 648. The buffer 642 is connected to the second DQ pad DQ16 and buffers data input through DQ16 from the outside by a bus line 626. The buffer 642 receives a reference voltage VREF. One input terminal of the selection unit 646 is connected to a bus line 644 connected to the buffer 642 and another input terminal of the selection unit 646 is connected to a bus line 636 connected to the buffer 632 of the first write memory cell array selection circuit 630, and the selection unit 646 selects between two buffers 632 and 642 to output the data from the selected buffer based on a selection control signal S55 received by the selection unit 646 from the DQ organization reconfiguration unit 260. The bus line 648 connects the selection unit 646 to the second memory cell array region corresponding to the second DQ pad DQ16.

In some embodiments, similarly to the first write memory cell array selection circuit 630, the third write memory cell array selection circuit 650 may include a buffer 652, connected to the third DQ pad DQ8, for buffering data input through DQ8 from the outside by a bus line 624, a bus line 654 connecting the buffer 652 to the third memory cell array region corresponding to DQ8, and a timing gate 676 disposed on the bus line 654 for switch-controlling whether or not the data from the buffer 652 should be transferred to the third memory cell array region. As mentioned above, the timing gate 676 is connected to the transmission gate 674 of the first write memory cell array selection circuit 630. The buffer 652 receives a reference voltage VREF.

In some embodiments, similarly to the second write memory cell array selection circuit 640, the fourth write memory cell array selection circuit 660 may include a buffer 662, a selection unit 666, and a bus line 668. The buffer 662 is connected to the fourth DQ pad DQ24 by a bus line 628 and buffers data input from the outside. The selection unit 666 has one input terminal connected to the buffer 662 through a bus line 664 and another input terminal connected to the buffer 652 of the third write memory cell array selection circuit 650 through a bus line 656. The bus line 668 connects the output terminal of the selection unit 666 to the fourth memory cell array region corresponding to DQ24. The selection unit 666 may select between the two buffers 662 and 652 to allow the data from the selected buffer to be written in the fourth memory cell array region through the bus line 668 based on a selection control signal S56 received by the selection unit 666 from the DQ organization reconfiguration unit 260.

According to the write DQ organization reconfiguration unit circuit 600 having the configuration described above, the data input through the first through fourth DQ pads DQ0, DQ16, DQ8, and DQ24 can be transferred to the first through fourth memories to be written therein, respectively (refer to the write operation in X32 mode). Alternatively, only the first and third DQ pads DQ0 and DQ8 among the four DQ pads may be used for data input. In such an embodiment, the data input through the DQ0 pad may be written into the first memory cell array region via the first write memory cell array selection circuit 630 or into the second memory cell array region through the first and second write memory cell array selection circuits 630 and 640. Similarly, the data input through the DQ8 pad may be written into the third memory cell array region via the third write memory cell array selection circuit 650 or into the fourth memory cell array region through the third and fourth write memory cell array selection circuits 650 and 660 (refer to the write operation in X16 mode). Further, only the first DQ pad DQ0 among the four DQ pads may be used for data input. In such an embodiment, the data input through the DQ0 pad may be written into the first memory cell array area through the first write memory cell array selection circuit 630, or into the second to fourth memory cell array regions after having been transferred to the second through fourth write memory cell array selection circuits 640, 650, and 660, respectively (refer to the write operation in X8 mode). By using the write DQ organization reconfiguration unit circuit 600 as described above, the data transfer paths for the write operation between the DQ pads and the memory cell array regions can be flexibly reconfigured on-the-fly, that is, while the device is in use.

The write operation in the X16 mode will be described in detail with reference to FIGS. 3 and 10. In the X16 mode, external data may be input through the DQ0 to DQ15 pads. The data input to the first 4-DQ pad group 135 may be input through two DQ pads, that is, the DQ0 pad and the DQ8 pad.

In CASE1, the switching must be controlled such that the data input to the DQ0 pad is output to the memory cell array region corresponding to the DQ0 pad, and the data input to the DQ8 pad is output to the memory cell array region corresponding to the DQ8 pad. The switching control may be performed such that the transmission gates 672 and 676 are turned ON and the transmission gate 674 is turned OFF. In addition, the switching control may be performed such that the selection unit 646 of the second write memory cell array selection circuit 640 selects the buffer 642 connected to the DQ16 pad having no data input and the selection unit 666 of the fourth write memory cell array selection circuit 660 selects the buffer 662 connected to the DQ24 pad having no data input.

In CASE2, the switching control may be performed such that data input to the DQ0 pad is output to the memory cell array region corresponding to the adjacent DQ16 pad, and data input to the DQ8 pad is output to the memory cell array region corresponding to the adjacent DQ24 pad. The switching control may be performed as follows. The transmission gates 672, 674, and 676 are all turned OFF. The selection unit 646 may perform switching control such that the output of the buffer 632 is selected. The selection unit 666 may perform switching control such that the output of the buffer 652 is selected. Thus, the data input to the DQ0 pad can be transferred to the second write memory cell array selection circuit 640 and output to the memory cell array corresponding to the DQ16 pad. The data input to the DQ8 pad can be transferred to the fourth write memory cell array selection circuit 660, and output to the memory cell array corresponding to the DQ24 pad.

In some embodiments, the switching control for CASE1 and CASE2 may be performed by the DQ organization reconfiguration control unit 260 that provides necessary switching signals S52, S53, and S54 to the transmission gates 676, 674, and 672, respectively, as well as the necessary selection control signals S55 and S56 to the selection units 646 and 666, respectively.

In some embodiments, for the write operation in the X32 mode, the DQ organization reconfiguration control unit 260 may perform switching control such that the transmission gates 672 and 676 are turned ON based on switching signals S54 and S52, respectively, and the transmission gate 674 is turned OFF based on switching signal S53. The selection unit 646 selects the output of the buffer 642 and the selection unit 666 selects the output of the buffer 662. Thus, the data input to the DQ0 pad may be transferred to the memory cell array region corresponding to the DQ0 pad, the data input to the DQ16 pad may be transferred to the memory cell array region corresponding to the DQ16 pad, the data input to the DQ8 pad may be transferred to the memory cell array region corresponding to the DQ8 pad, and the data input to the DQ24 pad may be transferred to the memory cell array region corresponding to the DQ24 pad.

The write operation in the X8 mode will be described with reference to FIG. 2 and FIG. 10. According to some embodiments, in the write operation in the X8 mode, data to be written to the memory cell may be input to the DQ0 to DQ7 pads. In the first four-DQ pad group 135, data may be input only to the DQ0 pad. The switching control must be performed such that data input to the DQ0 pad can be written into the memory cell array regions corresponding to DQ0, DQ16, DQ8, and DQ24, respectively.

For CASE1 (0→0), the switching control may be performed such that only the transmission gate 672 is turned ON based on switching signal S54, at the same time, the selection unit 646 selects the buffer 642 having no data input based on switching signal S55, and the remaining transmission gates 674 and 676 are all turned OFF based on switching signals S53 and S52, respectively.

For CASE2 (0→8), switching control may be performed such that the data input to the DQ0 pad is transferred to the third memory cell array corresponding to the DQ8 pad. In such an embodiment, the transmission gate 672 is turned OFF based on switching signal S54 and the remaining two transmission gates 674 and 676 are switched ON based on switching signals S53 and S52, respectively. In addition, the selection unit 646 selects the buffer 642 that has no data input based on switching signal S55.

For CASE3 (0→16), switching control may be performed such that the data input to the DQ0 pad is transferred to a second memory cell array corresponding to the DQ16 pad. In such an embodiment, the selection unit 646 selects the buffer 632 based on switching signal S55 for outputting the data input to the DQ0 pad, and switches the transmission gates 672, 674 and 676 OFF based on switching signals S54, S53 and S52, respectively.

For CASE4 (0→24), switching control may be performed such that the data input to the DQ0 pad is transferred to the fourth memory cell array corresponding to the DQ24 pad. In such an embodiment, the transmission gate 674 is turned ON based on the switching signal S53 and the selection unit 666 selects the bus line 656 connected to the transmission gate 674 based on the switching signal S56. At the same time, the remaining transmission gates 672 and 676 are turned OFF based on switching signals S54 and S52, respectively, and the selection unit 646 selects the buffer 642 having no data input based on switching signal S55.

In some embodiments, the switching controls for CASE1 to CASE4 may also be performed by the DQ organization reconfiguration control unit 260 that provides the necessary switching signals S54, S53 and S52 to the transmission gates 672, 674 and 676, respectively, and the necessary selection control signals S55 and S56 to the selection units 646 and 666, respectively.

Figure 11A:
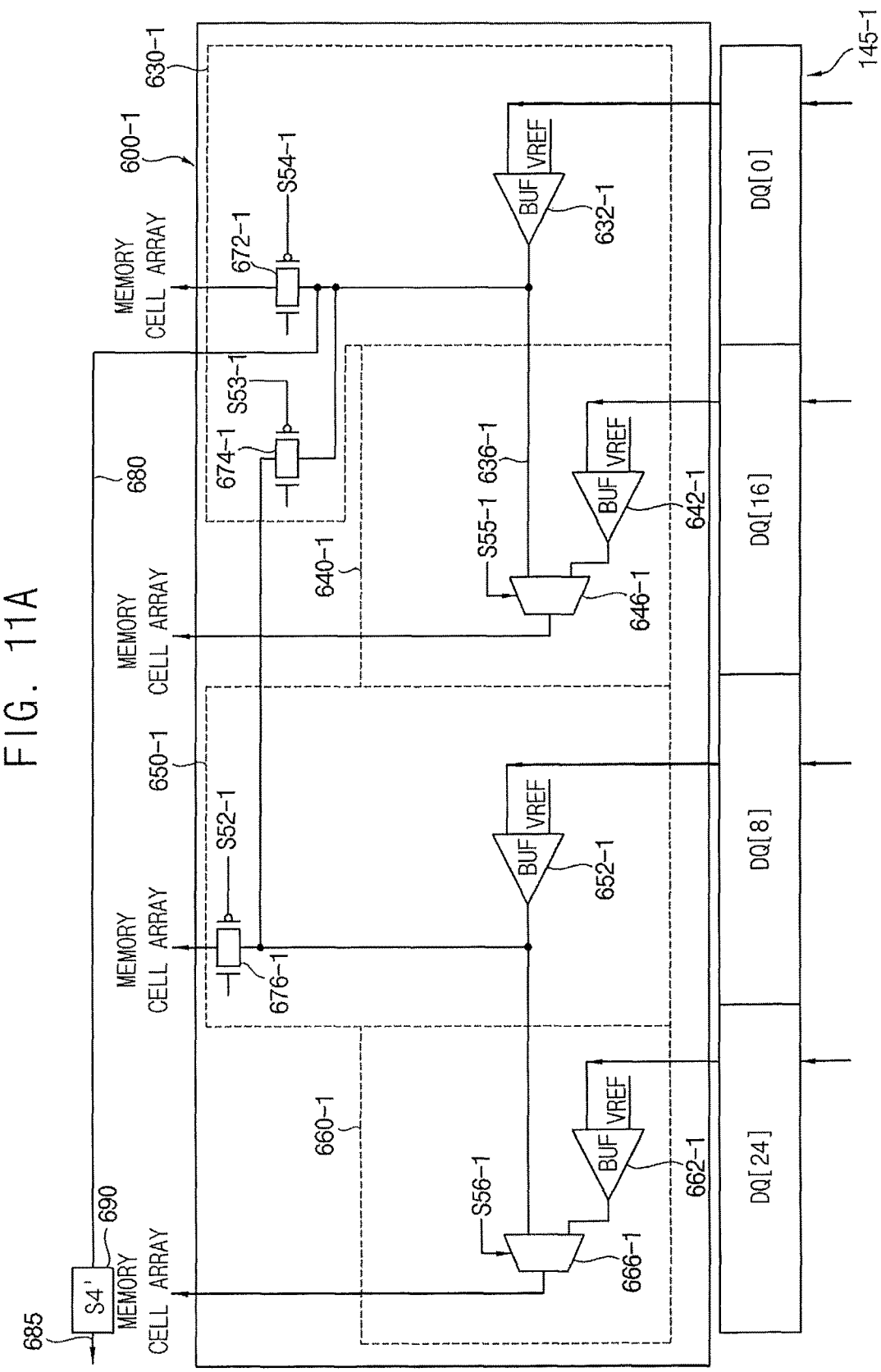
FIGS. 11A and 11B are schematic diagrams illustrating a configuration of a DQ organization reconfiguration unit for a write operation for two four-DQ pad groups, in accordance with some embodiments of the present inventive concepts.
Figure 11B:
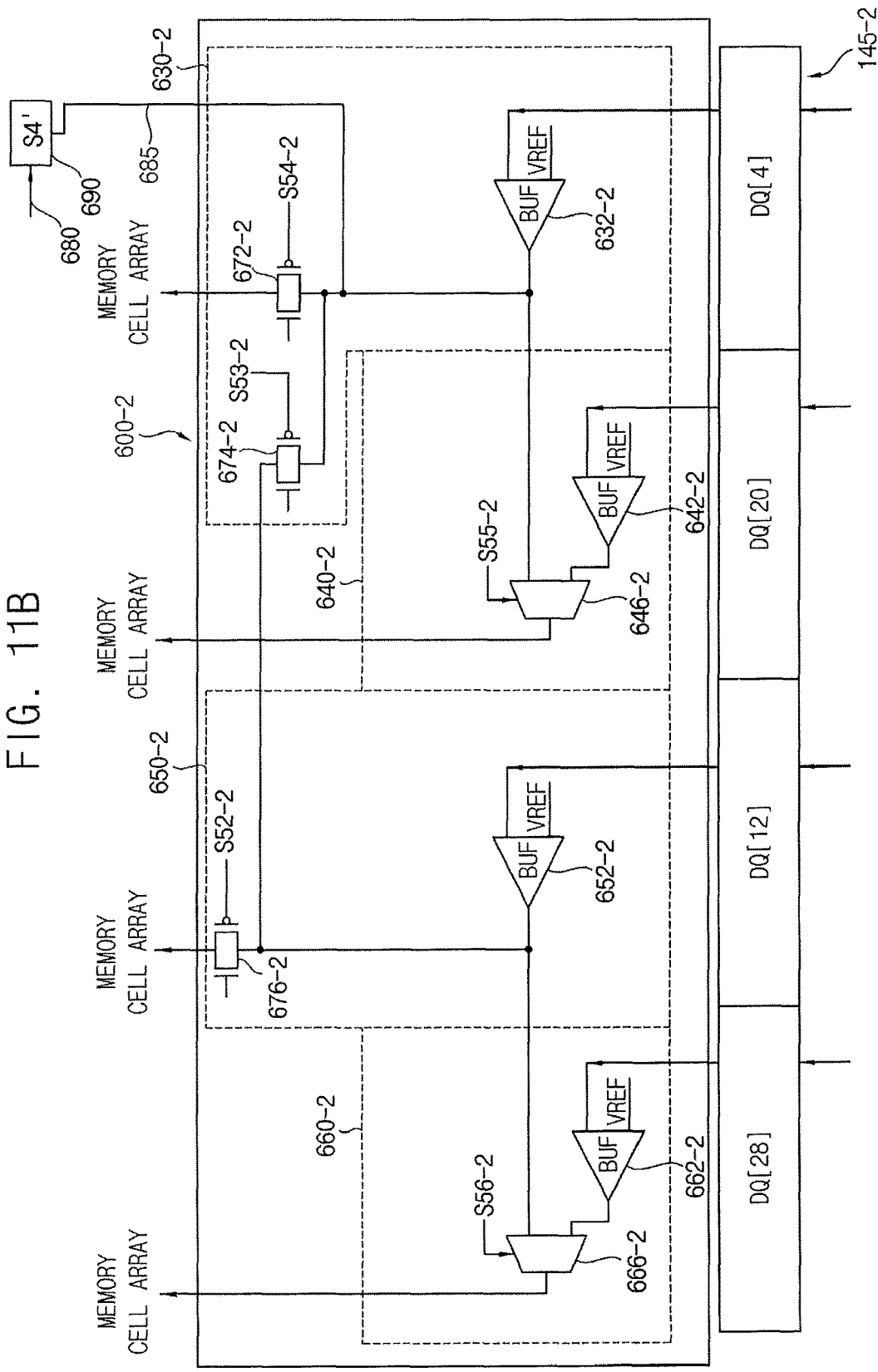

FIGS. 11A and 11B illustrate some configurations of the write DQ organization reorganization unit circuits 600-1 and 600-2 for the right half 145-1 and the left half 145-2 of one eight-DQ pad group 145, respectively, of FIG. 1. The circuit 600-1 of FIG. 11A and the circuit 600-2 of FIG. 11B have substantially the same circuit configuration as the circuit 600 of FIG. 10. Among the elements shown in FIGS. 11A and 11B, the same elements as those of FIG. 10 are denoted by the same reference numerals with a dash (-) attached thereto. The circuits shown in FIGS. 11A and 11B are characterized in that, the first write memory cell array selection circuit 630-1 of the write DQ organization reconfiguration unit circuit 600-1 for the right half 145-1 of the first eight-DQ pad group 145 is connected to the first write memory cell array selection circuit 630-2 of the write DQ organization reconfiguration unit circuit 600-2 for the left half 145-2 of the first eight-DQ pad group 145 by switchable-connecting the output terminal of the buffer 632-1 and the output terminal of the buffer 632-2 through bus lines 680 and 685 and a switch unit 690 (S4'). The switch unit 690 (S4') may be implemented as a transmission gate, for example.

The write operation in the X4 mode will be described with reference to FIGS. 11A and 11B and (a) of FIG. 4. In the X4 mode, the data to be written into the memory cell arrays may be input through four DQ pads DQ0 to DQ3. In the first eight-DQ pad group 145, the data is input through only the DQ0 pad. The switching control must be performed such that the data input through the DQ0 pad can be written into the memory cell array regions corresponding to DQ0, DQ16, DQ8, DQ24, DQ4, DQ20, DQ12 and DQ28, respectively, of the first eight-DQ pad group 145.

The operation in which the data input through the DQ0 pad are written into the memory cell arrays corresponding to DQ0, DQ16, DQ8, and DQ24 respectively which are the right half 145-1 of the first 8-DQ pad group 145, has been described with reference to FIG. 10. When this operation is performed, the switch unit 690 (S4') is turned OFF based on a switching signal.

To allow the data input through the DQ0 pad to be written into the memory cell arrays corresponding to DQ pads DQ4, DQ20, DQ12, and DQ28, which are the left half 145-2 of the first eight-DQ pad group 145, respectively, first, the data input through the DQ0 pad and then output from the buffer 632-1 must be transferred to the output terminal of the buffer 632-2. For this, all the transmission gates 672-1, 674-1, and 676-1 of the first write DQ organization reconfiguration unit circuit 600-1 may be turned OFF based on switching signals S45-1, S53-1 and S52-1, respectively, and the switch unit 690 (S4') may be turned ON based on a switching signal. The circuit 600-2 shown in FIG. 11B operates in the same manner as the circuit 600-1 in FIG. 11A or the circuit 600 in FIG. 10. With reference to the description of the circuit 600 in FIG. 10, it will be understood that the data input through the DQ0 pad transferred to the second write DQ organization reconfiguration unit circuit 600-2 may be output to the memory cell array regions corresponding to four DQ pads DQ4, DQ20, DQ12, and DQ28, respectively, which are the left half 145-2 of the first eight-DQ pad group 145 in the same manner as the data input through the DQ0 pad is output to the memory cell array regions corresponding to the DQ pads DQ0, DQ16, DQ8 and DQ24. The switching control for this output may also be performed by the DQ organization reconfiguration control unit 260 that provides the necessary switching signals S52-1, S53-1, S54-1, S52-2, S53-2, and S54-2 to the transmission gates 676-1, 674-1, 672-1, 676-2, 674-2, and 672-2, respectively, and that provides the necessary selection control signals S55-1, S56-1, S55-2, and S56-2 to the selection units 646-1, 666-1, 646-2, and 666-2, respectively, and the switch unit 690 (S4') as shown in FIGS. 11A and 11B.

The write operation through each of the remaining second to fourth eight-DQ pad groups of the thirty-two DQ pads may also be performed using the same circuits as those shown in FIGS. 11A and 11B.

It will be appreciated that a write operation for the X2 mode can be implemented by applying the same principle as above in connection with FIGS. 11A and 11B. That is, for the sixteen DQ pad group 155 (see (a) of FIG. 5) of the left half of the thirty-two DQ pads, a circuit having the circuit 600-1 shown in FIG. 11A and the circuit 600-2 shown in FIG. 11B connected by the switch unit 690 (S4') may be prepared twice. Then, the two prepared circuits may be connected to each other in the manner that the output terminal of the first output buffer 632-1 of the first circuit is connected to the output terminal of the first output buffer of the second circuit through a switch unit, for example, switching unit 2 of FIG. 8. That is, a first circuit having the circuit 600-1 shown in FIG. 11A and the circuit 600-2 shown in FIG. 11B connected by the switch unit 690 (S4') and a second circuit having the circuit 600-1 shown in FIG. 11A and the circuit 600-2 shown in FIG. 11B connected by the switch unit 690 (S4') may be connected by a switch unit such that the output terminal of the first output buffer 632-1 of the first circuit is connected to the output terminal of the first output buffer 632-1 of the second circuit.

In order to implement the circuits 300, 500, 600, 600-1, 600-2, etc. shown in FIGS. 7, 8, 10, 11A and 11B described above, a plurality of bus lines must be added. The method of implementing the plurality of additional bus lines in the M1 and M2 metal layers is difficult to adopt in reality due to the overhead of the chip size being enormous and the economic feasibility being remarkably low. However, the method of constructing the plurality of additional bus lines by utilizing the routing layers such as M3 and/or M4 metal layers which have been recently introduced in the DRAM, may minimize or substantially prevent the overhead of the chip size. The present inventive concepts are advantageous in that one type of DRAM device can be used while flexibly switching the organization of the DQ pads from the X1 mode to the X32 mode on-the-fly, that is, while the device is in use. In particular, if the present inventive concepts are implemented using the M4 layer, the overhead of the chip size may be prevented. If slight overhead of the chip size is acceptable, it is also possible to implement the present inventive concepts by utilizing the M3 layer. The present inventive concepts may be implemented using both M3 and M4 layers.

Figure 12:
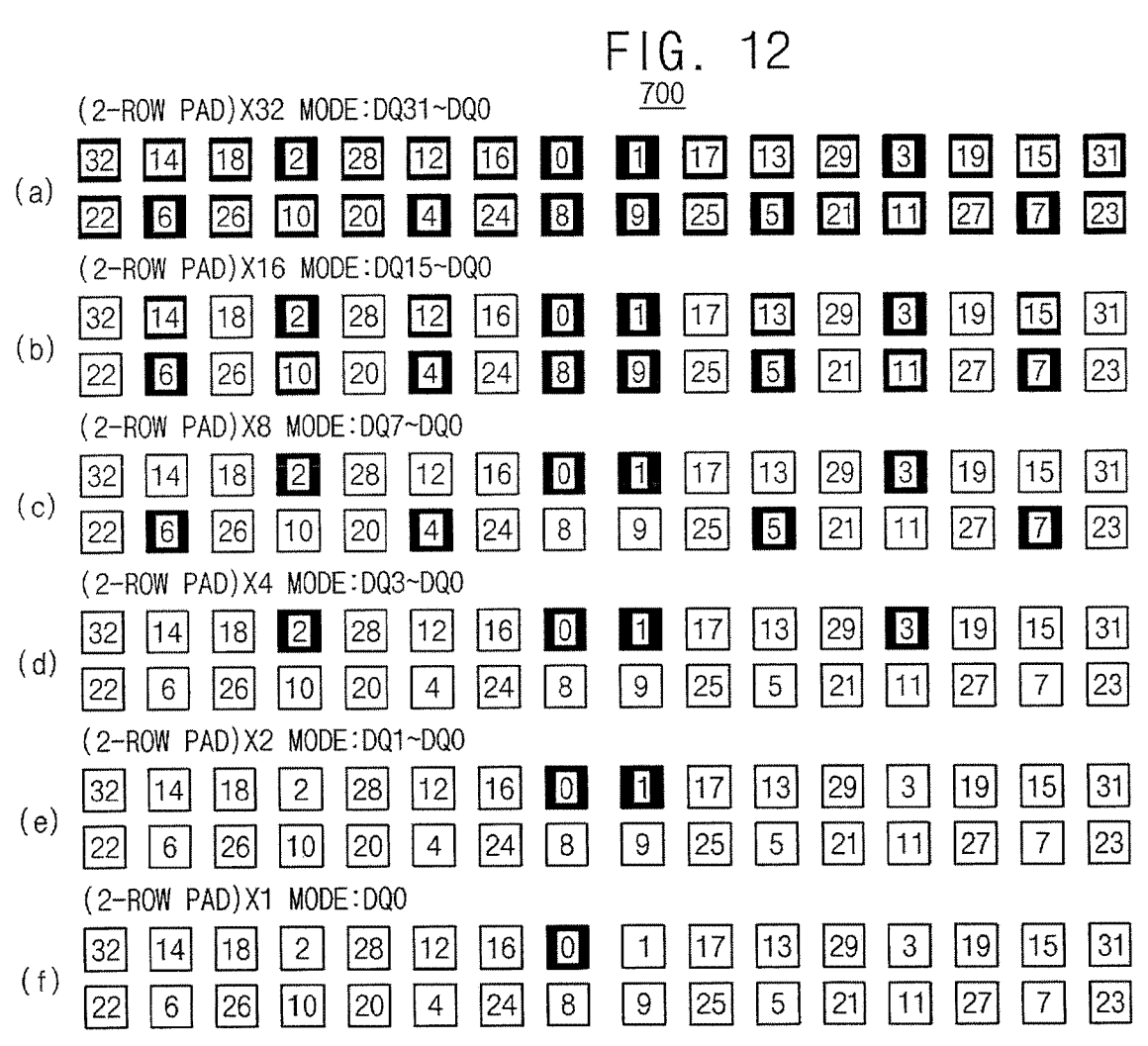

In the above description, thirty-two DQ pads are arranged in one row. However, the present inventive concepts are not limited to the one row pad structure. The present inventive concepts may be applied even when the DQ pads are composed of two or four rows. FIG. 12 illustrates a symmetrical arrangement 700 of two-row pads that may be applied when switching the mode of a DQ pad organization of a memory device from the X32 mode to the X1 mode on-the-fly, according to some embodiments of the present inventive concepts. In switching the DQ pad organization from the X32 mode to the X1 mode on-the-fly in the two-row pads shown, the DQ pads used in each mode (the DQ pads indicated by the thick boxes in the figure), that is, the active pads, may have a symmetrical arrangement about the center.

In addition, FIG. 13 illustrates a symmetrical arrangement of a four-row pads which may be applied when changing the mode of the DQ pad organization 800 of the memory device from the X32 mode to the X1 mode, according to some embodiments of the present inventive concepts. In changing the DQ pad organization from the X32 ode to the X1 mode on-the-fly in the four-row pads shown, the DQ pads used in each mode (the DQ pads indicated by the thick boxes in the figure), that is, the active pads, may also have a symmetrical arrangement about the center. The circuits illustrated in FIGS. 6 to 11B described above may be applied to the two-row pad structure 700 and the four-row pad structure 800 in substantially the same manner.

Although the embodiments of the present inventive concepts have been described above with reference to a DRAM device having thirty-two DQ pads, the present inventive concepts may be extensively applied to the DRAM devices with other numbers and/or arrangements of DQ pads. In general, the present inventive concepts may be applied to a memory device in which the number of DQ pads is P, where $P=2^n$ and n is 3, 4, 5, 6, and 7, and that includes a memory cell array corresponding to the P DQ pads. For example, the present inventive concepts may be applied not only to the cases in which the number of DQ pads is smaller than thirty-two, for example, for example, eight or sixteen but also to the cases in which the number of DQ pads is larger than thirty-two, for example, sixty-four or one hundred and twenty-eight. That is, according to the present inventive concepts, when a DQ pad mode in which only i DQ pads among P DQ pads are used for input/output operations to a memory cell array is referred to as Xi mode, where $i=2^k$ and k is an integer from 0 to n, and the organization of P DQ pads may be reconfigured to any one of the Xi modes. Although the number of DQ pads is different, the present inventive concepts described above may be applied in substantially the same manner. A person of ordinary skill in the art may implement the circuitry and the necessary control logic for reconfiguring on-the-fly the DQ pad organization in a memory device having a different number of DQ pads based on the above description of a memory device having thirty-two DQ pads.

The present inventive concepts have been described above with reference to several embodiments using a DRAM device as an example. However, the present inventive concepts are not limited to DRAM devices. The present inventive concepts may also be applied to other kinds of memory devices, for example, SRAM devices, flash memory devices, and the like. When the present inventive concepts are applied to other types of memory devices, the present inventive concepts may be suitably modified for appropriate application in consideration of their specific characteristics such as nature, property, usage conditions, and the like of each memory device.

The present inventive concepts may be applied to systems using the memory devices. The present inventive concepts may be applied to systems such as a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, or the like.

Although a few embodiments of the present general inventive concepts have been shown and described, it will be appreciated by those skilled in the art that changes may be made in these embodiments without departing from the principles and spirit of the general inventive concepts, the scope of which is defined in the appended claims and their equivalents.

What is claimed is:

1. A method of reconfiguring a DQ pad organization of a memory device comprising P DQ pads and memory cell arrays corresponding to the P DQ pads, comprising:

providing a DQ organization reconfiguration unit with a control signal for reconfiguring an organization of the P DQ pads, where $P=2^n$ and n is at least one of 4, 5, 6, and 7, into a desired DQ pad mode based on a user command, wherein the DQ organization reconfiguration unit between the P DQ pads and the memory cell arrays comprises data transfer paths through which data may be transferred between the P DQ pads and the memory cell arrays capable of reconfiguring the organization of the P DQ pads into at least one DQ pad mode among a plurality of DQ pad modes, and wherein the plurality of DQ pad modes include Xi DQ pad modes in which only i DQ pads among the P DQ pads are used for writing and reading data into/from the memory cell arrays, where $i=2^k$ and k is an integer from 0 to n; and reconfiguring the organization of the P DQ pads into a desired DQ pad mode by changing the data transfer paths of the DQ organization reconfiguration unit based on the control signal.

2. The method of claim 1, wherein the control signal is provided to the DQ organization reconfiguration unit during use of the memory device, and the reconfiguring the organization of the P DQ pads is performed during use of the memory device based on the control signal.

3. The method of claim 1, wherein, with the data transfer paths of the DQ organization reconfiguration unit, the P DQ pads are grouped into a plurality of four-DQ pad groups each of which includes four adjacent DQ pads, and the method further comprises:

performing a read operation in Xp DQ pad mode in which a number of active DQ pads is P by outputting first, second, third, and fourth data read from first, second, third, and fourth memory cell array regions, respectively, corresponding to first, second, third, and fourth DQ pads of each of the four-DQ pad groups, to the first, second, third, and fourth DQ pads through corresponding first, second, third, and fourth read DQ selection units, respectively, when the DQ pad mode is in the Xp DQ pad mode;

performing a read operation in X(p2) DQ pad mode in which a number of active DQ pads is P/2 by outputting the first and third data read from the first and third memory cell array regions, respectively, to the first and third DQ pads through the corresponding first and third read DQ selection units, respectively, and by outputting the second and fourth data read from the second and fourth memory cell array regions, respectively, to the first and third DQ pads by transferring the second and fourth data to the adjacent first and third read DQ selection units via the corresponding second and fourth read DQ selection units, respectively, when the DQ pad mode is the X(p/2) DQ pad mode; and performing a read operation in X(p/4) DQ pad mode in which a number of active DQ pads is P/4 by outputting the first data read from the first memory cell array region to the first DQ pad through the corresponding first read DQ selection unit, and by outputting the second, third and fourth data read from the second, third and fourth memory cell array regions, respectively, to the first DQ pad by transferring the second, third and fourth data to adjacent read DQ selection units via the corresponding second, third and fourth read DQ selection units, respectively, one or more times and then to the first read DQ selection unit, when the DQ pad mode is the X(p/4) DQ pad mode.

4. The method of claim 1, wherein, with the data transfer paths of the DQ organization reconfiguration unit, the P DQ pads are grouped into a plurality of four-DQ pad groups each of which includes four adjacent DQ pads, and the method further comprises:

performing a write operation in Xp DQ pad mode in which a number of active DQ pads is P by inputting first, second, third, and fourth data to be written in first, second, third, and fourth memory cell array regions, respectively, corresponding to first, second, third, and fourth DQ pads of each of the four-DQ pad groups, through the first, second, third, and fourth DQ pads, respectively, and by outputting the input first, second, third, and fourth data to first, second, third, and fourth memory cell array regions through corresponding first, second, third, and fourth write memory cell array selection units, respectively, when the DQ pad mode is the Xp DQ pad mode;

performing a write operation in X(p/2) DQ pad mode in which a number of active DQ pads is P/2 by inputting the first and second data to be written in the first and second memory cell array regions, respectively, through the first DQ pad, by outputting the input first data to the first memory cell array region through the first write memory cell array selection unit, by outputting the input second data to the second memory cell array region through the first write memory cell array selection unit and the adjacent second write memory cell array selection unit, by inputting the third and fourth data to be written in the third and fourth memory cell array regions, respectively, through the third DQ pad, by outputting the input third data to the third memory cell array region through the third write memory cell array selection unit, and by outputting the input fourth data to the fourth memory cell array region through the third write memory cell array selection unit and the adjacent fourth write memory cell array selection unit, when the DQ pad mode is the X(p/2) DQ pad mode; and performing a write operation in X(p/4) DQ pad mode in which a number of active DQ pads is P/4 by inputting the first, second, third, and fourth data to be written in the first, second, third, and fourth memory cell array regions through the first DQ pad, by outputting the input first data to the first memory cell array region through the first write memory cell array selection unit, and by outputting the input second, third, and fourth data to the second, third, and fourth memory cell array regions by transferring the input second, third, and fourth data from the first write memory cell array selection unit to the adjacent second, third, and fourth write memory cell array selection units, respectively, when the DQ pad mode is the X(p/4) DQ pad mode.

5. The method of claim 1, wherein with the data transfer paths the P DQ pads are grouped into a plurality of eight-DQ pad groups each of which includes eight adjacent DQ pads, and the method further comprising:

when the DQ pad mode is a X(p/8) DQ pad mode in which a number of active DQ pads is P/8, performing a read operation in the X(p/8) DQ pad mode by outputting first data read from a first memory cell array region corresponding to a first DQ pad of each eight-DQ pad group to the first DQ pad through a corresponding first read DQ selection unit, and by outputting second through eighth data read from second through eighth memory cell array regions corresponding to the second through eighth DQ pads of each eight-DQ pad group, respectively, to the first DQ pad by transferring the second through eighth data through corresponding second through eighth read DQ selection units, respectively, one or more times and then to the first read DQ selection unit, and performing a write operation in the X(p/8) DQ pad mode by inputting first through eighth data to be written in the first through eighth memory cell array regions through the first DQ pad, by outputting the input first data to the first memory cell array region through a first write memory cell array selection unit corresponding to the first DQ pad, and by outputting the input second through eighth data to the second through eighth memory cell array regions by transferring the input second through eighth data from the first write memory cell array selection unit to adjacent second through eighth write memory cell array selection units, respectively.

6. A memory device, including P DQ pads and memory cell arrays corresponding to the P DQ pads, comprising:

a DQ organization reconfiguration control unit configured to generate a control signal for reconfiguring an organization of the P DQ pads, where $P=2^n$ and n is at least one of 4, 5, 6, and 7, into a desired DQ pad mode based on a user command; and a DQ organization reconfiguration unit between the P DQ pads and the memory cell arrays comprising data transfer paths through which data may be transferred between the P DQ pads and the memory cell arrays capable of reconfiguring the organization of the P DQ pads into at least one DQ pad mode among a plurality of DQ pad modes, the DQ organization reconfiguration unit configured to reconfigure the organization of the P DQ pads into a desired DQ pad mode by changing the data transfer paths based on the control signal provided by the DQ organization reconfiguration control unit, wherein the plurality of DQ pad modes include Xi DQ pad modes in which only i DQ pads among the P DQ pads are used for writing and reading data into/from the memory cell arrays, where $i=2^k$ and k is an integer from 0 to n.

7. The memory device of claim 6, wherein providing the control signal to the DQ organization reconfiguration unit is performed during use of the memory device, and the DQ organization reconfiguration unit reconfigures the organization of the P DQ pads during use of the memory device based on the control signal.

8. The memory device of claim 6, wherein the DQ organization reconfiguration unit includes P/4 read DQ organization reconfiguration unit circuits each of which is provided for each four-DQ pad group including four adjacent DQ pads, wherein each of the P/4 read DQ organization reconfiguration unit circuits includes first, second, third, and fourth read DQ selection units configured to reconfigure the data transfer paths, wherein the fourth read DQ selection unit outputs fourth data read from a fourth memory cell array region corresponding to a fourth DQ pad of each four-DQ pad group to one of the fourth DQ pad and the adjacent third read DQ selection unit, based on an applied control signal, wherein the third read DQ selection unit outputs third data read from a third memory cell array region corresponding to a third DQ pad of each four-DQ pad group and the fourth data transferred from the fourth read DQ selection unit to one of the third DQ pad and the first read DQ selection unit, based on an applied control signal, wherein the second read DQ selection unit outputs second data read from a second memory cell array region corresponding to a second DQ pad of each four-DQ pad group to one the second DQ pad and the adjacent first read DQ selection unit, based on an applied control signal, and wherein the first read DQ selection unit outputs first data read from a first memory cell array region corresponding to a first DQ pad of each four-DQ pad group, the second data transferred from the second read DQ selection unit, the third data transferred from the third read DQ selection unit, and the fourth data transferred from the fourth read DQ selection unit to the first DQ pad.

9. The memory device of claim 8, wherein the DQ organization reconfiguration unit further includes a first switching unit, provided for each two adjacent read DQ organization reconfiguration unit circuits configured to control connection and disconnection of two adjacent read DQ organization reconfiguration unit circuits, and wherein the first switching unit includes a first bus line for connecting the two adjacent DQ organization reconfiguration unit circuits, and a first switching element on the first bus line configured to control ON/OFF of data transfer between the two adjacent read DQ organization reconfiguration unit circuits based on a first control signal provided by the DQ organization reconfiguration control unit.

10. The memory device of claim 8, wherein the DQ organization reconfiguration unit further comprises a second switching unit and a third switching unit, wherein the second switching unit comprises a second bus line for connecting two adjacent odd-numbered read DQ organization reconfiguration unit circuits, and a second switching element, on the second bus line, configured to control ON/OFF of data transfer between the two adjacent odd-numbered read DQ organization reconfiguration unit circuits based on a second control signal provided by the DQ organization reconfiguration control unit, and wherein the third switching unit comprises a third bus line for connecting two adjacent even-numbered read DQ organization reconfiguration unit circuits, and a third switching element, on the third bus line, configured to control ON/OFF of data transfer between the two adjacent even-numbered read DQ organization reconfiguration unit circuits based on a third control signal provided by the DQ organization reconfiguration control unit.

11. The memory device of claim 6, wherein the DQ organization reconfiguration unit includes P/4 write DQ organization reconfiguration unit circuits each of which is provided for each four-DQ pad group including four adjacent DQ pads, wherein each of the P/4 write DQ organization reconfiguration unit circuits includes first, second, third, and fourth write memory cell array selection units configured to reconfigure the data transfer paths, wherein the first write memory cell array selection unit outputs first data input through a first DQ pad of each four-DQ pad group to a first memory cell array region corresponding to the first DQ pad, transfers second data input through the first DQ pad to the second write memory cell array selection unit, and transfers third and fourth data input through the first DQ pad to the third write memory cell array selection unit, based on an applied control signal, wherein the second write memory cell array selection unit outputs one of the second data input through the second DQ pad and the second data transferred from the first write memory cell array selection unit to a second memory cell array region corresponding to the second DQ pad, based on an applied control signal, wherein the third write memory cell array selection unit outputs one of the third data input through the third DQ pad and the third data transferred from the first write memory cell array selection unit to a third memory cell array region corresponding to the third DQ pad, and transfers the fourth data transferred from the first write memory cell array selection unit to the fourth write memory cell array selection unit, based on an applied control signal, and wherein the fourth write memory cell array selection unit outputs one of the fourth data input through the fourth DQ pad and the fourth data transferred from the third write memory cell array selection unit to a fourth memory cell array region corresponding to the fourth DQ pad, based on an applied control signal.

12. The memory device of claim 11, wherein the DQ organization reconfiguration unit further includes a fourth switching unit, provided for each two adjacent write DQ organization reconfiguration unit circuits, switching connection/disconnection of the two adjacent write DQ organization reconfiguration unit circuits, and wherein the fourth switching unit comprises a fourth bus line connecting the two adjacent write DQ organization reconfiguration unit circuits, and a fourth switching element, on the fourth bus line, controlling ON/OFF of data transfer between the two adjacent write DQ organization reconfiguration unit circuits based on a fourth control signal provided by the DQ organization reconfiguration control unit.

13. The memory device of claim 12, wherein the DQ organization reconfiguration unit further includes a fifth switching unit and a sixth switching unit, wherein the fifth switching unit comprises a fifth bus line connecting two adjacent odd-numbered write DQ organization reconfiguration unit circuits, and a fifth switching element, on the fifth bus line, controlling ON/OFF of data transfer between the two adjacent odd-numbered write DQ organization reconfiguration unit circuits based on a fifth control signal provided by the DQ organization reconfiguration control unit, and wherein the sixth switching unit comprises a sixth bus line connecting two adjacent even-numbered write DQ organization reconfiguration unit circuits, and a sixth switching element, on the sixth bus line, controlling ON/OFF of data transfer between the two adjacent even-numbered write DQ organization reconfiguration unit circuits based on a sixth control signal provided by the DQ organization reconfiguration control unit.

14. The memory device of claim 6, wherein at least a portion of the data transfer paths of the DQ organization reconfiguration unit is implemented utilizing at least one of an M3 metal layer and an M4 metal layer of the memory device.

15. The memory device of claim 6, wherein the P DQ pads comprise at least one among a single-row arrangement, a two-row arrangement, and a four-row arrangement, and active DQ pads in the DQ pad mode reconfigured by the DQ organization reconfiguration unit are arranged in a substantially symmetrical arrangement with respect to the center thereof.

16. A memory device, including P DQ pads and memory cell arrays corresponding to the P DQ pads, comprising:
    a DQ organization reconfiguration control unit configured to generate control signals for reconfiguring an organization of the P DQ pads, where $P=2^n$ and n is at least one of 4, 5, 6, and 7, into a desired DQ pad mode based on a user command; and
    a DQ organization reconfiguration unit between the P DQ pads and the memory cell arrays configured to reconfigure the organization of the P DQ pads during use of the memory device in at least one of Xi DQ pad modes in which only i DQ pads among the P DQ pads are used for writing and reading data into/from the memory cell arrays, where $i=2^k$ and k is an integer from 0 to n,
    wherein the DQ organization reconfiguration unit comprises a plurality of bus lines switchable by the control signals from the DQ organization reconfiguration control unit such that paths through which data may be transferred between the P DQ pads and the memory cell arrays may be variable.

17. The memory device of claim 16, wherein at least a portion of the plurality of bus lines of the DQ organization reconfiguration unit are implemented utilizing at least one of an M3 metal layer and an M4 metal layer of the memory device.

18. The memory device of claim 16, wherein the DQ organization reconfiguration unit includes P/4 read DQ organization reconfiguration unit circuits each of which is provided for each four-DQ pad group including four adjacent DQ pads, wherein each of the P/4 read DQ organization reconfiguration unit circuits includes first, second, third, and fourth read DQ selection units configured to reconfigure the bus lines, wherein the fourth read DQ selection unit outputs fourth data read from a fourth memory cell array region corresponding to a fourth DQ pad of each four-DQ pad group to one of the fourth DQ pad and the adjacent third read DQ selection unit, based on an applied control signal, wherein the third read DQ selection unit outputs third data read from a third memory cell array region corresponding to a third DQ pad of each four-DQ pad group and the fourth data transferred from the fourth read DQ selection unit to one of the third DQ pad and the first read DQ selection unit, based on an applied control signal, wherein the second read DQ selection unit outputs second data read from a second memory cell array region corresponding to a second DQ pad of each four-DQ pad group to one the second DQ pad and the adjacent first read DQ selection unit, based on an applied control signal, and wherein the first read DQ selection unit outputs first data read from a first memory cell array region corresponding to a first DQ pad of each four-DQ pad group, the second data transferred from the second read DQ selection unit, the third data transferred from the third read DQ selection unit, and the fourth data transferred from the fourth read DQ selection unit to the first DQ pad.

19. The memory device of claim 16, wherein the DQ organization reconfiguration unit further includes a first switching unit, provided for each two adjacent read DQ organization reconfiguration unit circuits configured to control connection and disconnection of two adjacent read DQ organization reconfiguration unit circuits, and wherein the first switching unit includes a first bus line for connecting the two adjacent DQ organization reconfiguration unit circuits, and a first switching element on the first bus line configured to control ON/OFF of data transfer between the two adjacent read DQ organization reconfiguration unit circuits based on a first control signal provided by the DQ organization reconfiguration control unit.

20. The memory device of claim 16, wherein the DQ organization reconfiguration unit includes P/4 write DQ organization reconfiguration unit circuits each of which is provided for each four-DQ pad group including four adjacent DQ pads, wherein each of the P/4 write DQ organization reconfiguration unit circuits includes first, second, third, and fourth write memory cell array selection units configured to reconfigure the bus lines, wherein the first write memory cell array selection unit outputs first data input through a first DQ pad of each four-DQ pad group to a first memory cell array region corresponding to the first DQ pad, transfers second data input through the first DQ pad to the second write memory cell array selection unit, and transfers third and fourth data input through the first DQ pad to the third write memory cell array selection unit, based on an applied control signal, wherein the second write memory cell array selection unit outputs one of the second data input through the second DQ pad and the second data transferred from the first write memory cell array selection unit to a second memory cell array region corresponding to the second DQ pad, based on an applied control signal, wherein the third write memory cell array selection unit outputs one of the third data input through the third DQ pad and the third data transferred from the first write memory cell array selection unit to a third memory cell array region corresponding to the third DQ pad, and transfers the fourth data transferred from the first write memory cell array selection unit to the fourth write memory cell array selection unit, based on an applied control signal, and wherein the fourth write memory cell array selection unit outputs one of the fourth data input through the fourth DQ pad and the fourth data transferred from the third write memory cell array selection unit to a fourth memory cell array region corresponding to the fourth DQ pad, based on an applied control signal.

* * * * *